US012670461B2

(12) United States Patent　　　　(10) Patent No.:　　US 12,670,461 B2
　　Gillen　　　　　　　　　　　　　　(45) Date of Patent:　　　Jun. 30, 2026

(54) ELECTRONICALLY CONNECTABLE PACKAGING SYSTEMS CONFIGURED FOR SHIPPING ITEMS

(71) Applicant: United Parcel Service of America, Inc., Atlanta, GA (US)

(72) Inventor: Robert J. Gillen, Alpharetta, GA (US)

(73) Assignee: United Parcel Service of America, Inc., Atlanta, GA (US)

( * ) Notice:　Subject to any disclaimer, the term of this patent is extended or adjusted under 35 U.S.C. 154(b) by 0 days.

(21) Appl. No.: 18/952,556

(22) Filed:　Nov. 19, 2024

(65)　　　　　Prior Publication Data

US 2025/0094913 A1　　Mar. 20, 2025

Related U.S. Application Data

(63) Continuation of application No. 18/465,660, filed on Sep. 12, 2023, now Pat. No. 12,175,407, which is a
(Continued)

(51) Int. Cl.
　　*G06Q 10/083*　　　(2024.01)
　　*G06Q 10/00*　　　(2023.01)
　　*G06Q 10/08*　　　(2024.01)
(52) U.S. Cl.
　　CPC ........... *G06Q 10/083* (2013.01); *G06Q 10/00* (2013.01); *G06Q 10/08* (2013.01)
(58) Field of Classification Search
　　CPC ....... G06V 20/20; G06Q 10/00; G06Q 10/083
(Continued)

(56)　　　　　References Cited

U.S. PATENT DOCUMENTS 3,576,368 A　　4/1971　Goetz et al.
3,783,295 A　　1/1974　Casler
　　　　　　(Continued)

FOREIGN PATENT DOCUMENTS

CN　　105701633 A　　6/2016
EP　　　0330184 A2　　8/1989
　　　　　　(Continued)

OTHER PUBLICATIONS

"Exploiting Synergies between Augmented Reality and RFIDs for Item Localization and Retrieval," by T. Boroushaki, M. Lam, W. Chen, L. Dodds, A. Eid and F. Adib, 2023 IEEE International Conference on Rfid (Rfid), Seattle, Wa, USA, 2023, pp. 30-35 (Year : 2023).*

(Continued)

*Primary Examiner* — Michael P Harrington
*Assistant Examiner* — Brian Adams Heflin
(74) *Attorney, Agent, or Firm* — Shook, Hardy & Bacon L.L.P.

(57)　　　　　ABSTRACT

Various embodiments are directed to methods and systems for initiating shipment of a connected shipment/item via a computing entity. The computing entity detects the presence of a shipment/item within a communication range of the computing entity based on received wireless communications, and initializes executable instructions upon detection of the electronically connected shipment/item to initiate shipment of the shipment/item. The executable instructions cause the computing entity to store a shipment identifier for the shipment/item, request and store shipment information/ data from a user for the shipment/item, and transmit the stored shipment/item information/data and the stored shipment identifier to a carrier computing entity to generate a shipment profile for the shipment/item.

18 Claims, 9 Drawing Sheets

Related U.S. Application Data continuation of application No. 17/412,514, filed on Aug. 26, 2021, now Pat. No. 11,803,803, which is a continuation of application No. 15/623,989, filed on Jun. 15, 2017, now Pat. No. 11,120,389.

(60) Provisional application No. 62/422,183, filed on Nov. 15, 2016.

(58) Field of Classification Search
USPC ........................................................ 705/330
See application file for complete search history.

(56) References Cited

U.S. PATENT DOCUMENTS

| | | | |
|---|---|---|---|
| 3,802,548 A | 4/1974 | Wentz et al. |
| 4,268,165 A | 5/1981 | Bradmon |
| 4,348,097 A | 9/1982 | Sippel |
| 4,498,744 A | 2/1985 | Ealovega et al. |
| 4,515,455 A | 5/1985 | Northmore |
| 4,544,064 A | 10/1985 | Felder |
| 4,597,495 A | 7/1986 | Knosby |
| 4,615,446 A | 10/1986 | Pavie |
| 4,649,504 A | 3/1987 | Krouglicof et al. |
| 4,711,357 A | 12/1987 | Langenbeck et al. |
| 4,736,109 A | 4/1988 | Dvorzsak |
| 4,760,247 A | 7/1988 | Keane et al. |
| 4,776,464 A | 10/1988 | Miller et al. |
| 4,788,596 A | 11/1988 | Kawakami et al. |
| 4,805,778 A | 2/1989 | Nambu |
| 4,832,204 A | 5/1989 | Handy et al. |
| 4,874,936 A | 10/1989 | Chandler et al. |
| 4,877,949 A | 10/1989 | Danielson et al. |
| 4,896,029 A | 1/1990 | Chandler et al. |
| 4,992,649 A | 2/1991 | Mampe et al. |
| 5,003,300 A | 3/1991 | Wells |
| 5,095,204 A | 3/1992 | Novini |
| 5,101,983 A | 4/1992 | Scata |
| 5,115,121 A | 5/1992 | Bianco et al. |
| 5,128,528 A | 7/1992 | Heninger |
| 5,140,141 A | 8/1992 | Inagaki et al. |
| 5,141,097 A | 8/1992 | Oiry et al. |
| 5,165,520 A | 11/1992 | Herve et al. |
| 5,185,822 A | 2/1993 | Miura |
| 5,190,162 A | 3/1993 | Hartlepp |
| 5,208,449 A | 5/1993 | Eastman et al. |
| 5,245,172 A | 9/1993 | Esslinger et al. |
| 5,281,957 A | 1/1994 | Schoolman |
| 5,305,244 A | 4/1994 | Newman et al. |
| 5,308,960 A | 5/1994 | Smith et al. |
| 5,309,190 A | 5/1994 | Shinohara et al. |
| 5,311,335 A | 5/1994 | Crabtree |
| 5,311,999 A | 5/1994 | Malow et al. |
| 5,323,327 A | 6/1994 | Carmichael et al. |
| 5,327,171 A | 7/1994 | Smith et al. |
| 5,329,469 A | 7/1994 | Watanabe |
| 5,353,091 A | 10/1994 | Ishida et al. |
| 5,380,994 A | 1/1995 | Ray |
| 5,431,288 A | 7/1995 | Nishijima et al. |
| 5,450,596 A | 9/1995 | Felsenstein |
| 5,463,432 A | 10/1995 | Kahn |
| 5,481,096 A | 1/1996 | Hippenmeyer et al. |
| 5,481,298 A | 1/1996 | Sasaki et al. |
| 5,485,263 A | 1/1996 | Bjorner et al. |
| 5,491,510 A | 2/1996 | Gove |
| 5,506,912 A | 4/1996 | Nagasaki et al. |
| 5,510,603 A | 4/1996 | Hess et al. |
| 5,515,447 A | 5/1996 | Zheng et al. |
| 5,566,245 A | 10/1996 | Zheng et al. |
| 5,567,927 A | 10/1996 | Kahn et al. |
| 5,607,187 A | 3/1997 | Salive et al. |
| 5,620,102 A | 4/1997 | Finch, Jr. |
| 5,642,442 A | 6/1997 | Morton et al. |
| 5,667,078 A | 9/1997 | Walach |
| 5,671,158 A | 9/1997 | Fournier et al. |
| 5,677,834 A | 10/1997 | Mooneyham |
| 5,682,030 A | 10/1997 | Kubon |
| 5,687,850 A | 11/1997 | Speckhart et al. |
| 5,695,071 A | 12/1997 | Ross et al. |
| 5,697,504 A | 12/1997 | Hiramatsu et al. |
| 5,699,440 A | 12/1997 | Carmeli |
| 5,725,253 A | 3/1998 | Salive et al. |
| 5,742,263 A | 4/1998 | Wang et al. |
| 5,770,841 A | 6/1998 | Moed et al. |
| 5,812,257 A | 9/1998 | Teitel et al. |
| 5,844,601 A | 12/1998 | Mcpheely et al. |
| 5,844,824 A | 12/1998 | Newman et al. |
| 5,857,029 A | 1/1999 | /B. A. |
| 5,869,820 A | 2/1999 | Chen et al. |
| 5,900,611 A | 5/1999 | Hecht |
| 5,920,056 A | 7/1999 | Bonnet |
| 5,923,017 A | 7/1999 | Bjorner et al. |
| 5,933,479 A | 8/1999 | Michael et al. |
| 5,943,476 A | 8/1999 | Dougherty et al. |
| 5,959,611 A | 9/1999 | Smailagic et al. |
| 6,046,712 A | 4/2000 | Beller et al. |
| 6,060,992 A | 5/2000 | Huang et al. |
| 6,061,644 A | 5/2000 | Leis |
| 6,064,354 A | 5/2000 | DeLuca |
| 6,064,476 A | 5/2000 | Goltsos |
| 6,064,749 A | 5/2000 | Hirota et al. |
| 6,085,428 A | 7/2000 | Casby et al. |
| 6,094,509 A | 7/2000 | Zheng et al. |
| 6,094,625 A | 7/2000 | Ralston |
| 6,114,824 A | 9/2000 | Watanabe |
| 6,122,410 A | 9/2000 | Zheng et al. |
| 6,148,249 A | 11/2000 | Newman |
| 6,172,657 B1 | 1/2001 | Kamakura et al. |
| 6,189,784 B1 | 2/2001 | Williams et al. |
| 6,204,764 B1 | 3/2001 | Maloney |
| 6,236,735 B1 | 5/2001 | Bjorner et al. |
| 6,243,054 B1 | 6/2001 | DeLuca |
| 6,243,620 B1 | 6/2001 | Robinson et al. |
| 6,244,015 B1 | 6/2001 | Ito et al. |
| 6,282,462 B1 | 8/2001 | Hopkins |
| 6,317,039 B1 | 11/2001 | Thomason |
| 6,330,356 B1 | 12/2001 | Sundareswaran et al. |
| 6,342,915 B1 | 1/2002 | Ozaki et al. |
| 6,352,349 B1 | 3/2002 | Braginsky et al. |
| 6,353,313 B1 | 3/2002 | Estep et al. |
| 6,377,401 B1 | 4/2002 | Bartlett |
| 6,411,266 B1 | 6/2002 | Maguire, Jr. |
| 6,417,969 B1 | 7/2002 | Deluca et al. |
| 6,437,823 B1 | 8/2002 | Zhang |
| 6,445,175 B1 | 9/2002 | Estep et al. |
| 6,714,121 B1 | 3/2004 | Moore |
| 6,808,114 B1 | 10/2004 | Palestini et al. |
| 6,878,896 B2 | 4/2005 | Braginsky et al. |
| 6,913,202 B2 | 7/2005 | Tsikos et al. |
| 6,961,456 B2 | 11/2005 | Bonner et al. |
| 7,035,856 B1 | 4/2006 | Morimoto |
| 7,063,256 B2 | 6/2006 | Anderson et al. |
| 7,395,962 B2 | 7/2008 | Barta et al. |
| 7,504,949 B1 | 3/2009 | Rouaix et al. |
| 7,624,024 B2 | 11/2009 | Levis et al. |
| 8,248,467 B1 | 8/2012 | Ganick et al. |
| 8,423,431 B1 * | 4/2013 | Rouaix ................ G06Q 10/087 |
| | | 705/28 |
| 8,936,192 B2 | 1/2015 | Reblin |
| 8,947,456 B2 | 2/2015 | Chen et al. |
| 9,053,378 B1 | 6/2015 | Hou et al. |
| 9,064,165 B2 | 6/2015 | Havens et al. |
| 9,070,032 B2 | 6/2015 | Corcoran |
| 9,091,530 B1 | 7/2015 | Ashford et al. |
| 9,171,278 B1 | 10/2015 | Kong et al. |
| 9,342,724 B2 | 5/2016 | Mccloskey et al. |
| 9,367,973 B2 | 6/2016 | Mcginnis et al. |
| 9,443,222 B2 | 9/2016 | Singel et al. |
| 9,632,313 B1 | 4/2017 | Madan et al. |
| 9,645,482 B2 | 5/2017 | Joseph |
| 9,658,310 B2 | 5/2017 | Loverich et al. |
| 9,686,481 B1 * | 6/2017 | Graybill .................. H04N 7/18 |
| 9,697,548 B1 | 7/2017 | Jaff et al. |
| 9,911,290 B1 | 3/2018 | Zalewski et al. |

(56) References Cited

U.S. PATENT DOCUMENTS

| | | |
|---|---|---|
| 10,121,118 B1 | 11/2018 | Kim et al. |
| 10,125,403 B2 | 11/2018 | Bohringer et al. |
| 10,148,918 B1 | 12/2018 | Seiger et al. |
| 10,169,677 B1 | 1/2019 | Ren et al. |
| 10,192,194 B2 | 1/2019 | Bernhardt et al. |
| 10,248,879 B2 | 4/2019 | Schimmel |
| 10,250,720 B2 | 4/2019 | Clement et al. |
| 10,281,555 B2 | 5/2019 | Loverich et al. |
| 10,369,597 B2 | 8/2019 | Farlotti |
| 10,394,843 B2 | 8/2019 | Lee et al. |
| 10,438,409 B2 | 10/2019 | Todeschini et al. |
| 10,482,341 B2 | 11/2019 | Takahashi et al. |
| 10,484,508 B2 | 11/2019 | Clement et al. |
| 10,495,723 B2 | 12/2019 | Loverich et al. |
| 10,535,169 B2 | 1/2020 | Dotterweich et al. |
| 10,621,457 B2 | 4/2020 | Schimmel |
| 10,859,665 B2 | 12/2020 | Loverich et al. |
| 11,105,887 B2 | 8/2021 | Loverich et al. |
| 11,238,298 B2 | 2/2022 | Schimmel |
| 11,238,397 B2 | 2/2022 | Skaaksrud |
| 11,429,919 B1 | 8/2022 | Whitehouse et al. |
| 11,436,553 B2* | 9/2022 | Kirmani ............. G06Q 10/0833 |
| 11,501,244 B1* | 11/2022 | Hill ...................... G06K 7/1413 |
| 2001/0032805 A1 | 10/2001 | Lawandy et al. |
| 2001/0033685 A1 | 10/2001 | Ishiyama |
| 2001/0042055 A1 | 11/2001 | Didriksen et al. |
| 2002/0010661 A1 | 1/2002 | Waddington et al. |
| 2002/0063159 A1 | 5/2002 | Wilz et al. |
| 2002/0075201 A1 | 6/2002 | Sauer et al. |
| 2002/0082498 A1 | 6/2002 | Wendt et al. |
| 2002/0092913 A1* | 7/2002 | Bard .................. G06K 7/10584 |
| | | 235/472.02 |
| 2002/0105484 A1 | 8/2002 | Navab et al. |
| 2002/0113756 A1 | 8/2002 | Tuceryan et al. |
| 2002/0120475 A1 | 8/2002 | Morimoto |
| 2003/0034392 A1 | 2/2003 | Grimm et al. |
| 2003/0036985 A1 | 2/2003 | Soderholm |
| 2003/0083076 A1 | 5/2003 | Pradhan et al. |
| 2003/0106771 A1 | 6/2003 | Takizawa |
| 2003/0179218 A1 | 9/2003 | Martins et al. |
| 2004/0004119 A1 | 1/2004 | Baldassari et al. |
| 2004/0008113 A1 | 1/2004 | Pradhan et al. |
| 2004/0016684 A1 | 1/2004 | Braginsky et al. |
| 2004/0051680 A1 | 3/2004 | Azuma et al. |
| 2004/0088229 A1 | 5/2004 | Xu |
| 2004/0148518 A1 | 7/2004 | Grundback et al. |
| 2004/0150387 A1 | 8/2004 | Lyon et al. |
| 2004/0153539 A1 | 8/2004 | Lyon et al. |
| 2004/0178269 A1 | 9/2004 | Pradhan et al. |
| 2004/0178270 A1 | 9/2004 | Pradhan et al. |
| 2005/0222853 A1 | 10/2005 | Black et al. |
| 2005/0275831 A1 | 12/2005 | Silver |
| 2005/0280803 A1 | 12/2005 | Slesinski et al. |
| 2006/0235739 A1 | 10/2006 | Levis et al. |
| 2007/0024810 A1 | 2/2007 | Ashford |
| 2007/0229767 A1 | 10/2007 | Ikeda et al. |
| 2008/0183328 A1 | 7/2008 | Danelski |
| 2008/0224831 A1 | 9/2008 | Arai et al. |
| 2009/0069033 A1 | 3/2009 | Karstens et al. |
| 2009/0099943 A1 | 4/2009 | Bodin et al. |
| 2010/0022221 A1 | 1/2010 | Yi et al. |
| 2010/0121480 A1 | 5/2010 | Stelzer et al. |
| 2010/0201488 A1 | 8/2010 | Stern et al. |
| 2010/0201520 A1 | 8/2010 | Stern et al. |
| 2011/0012731 A1 | 1/2011 | Stevens |
| 2011/0164163 A1 | 7/2011 | Bilbrey et al. |
| 2011/0199187 A1 | 8/2011 | Davidowitz |
| 2012/0063125 A1 | 3/2012 | Quaal et al. |
| 2012/0069131 A1 | 3/2012 | Abelow |
| 2012/0214515 A1 | 8/2012 | Davis et al. |
| 2012/0230581 A1 | 9/2012 | Miyashita et al. |
| 2012/0286698 A1 | 11/2012 | Pas |
| 2013/0069985 A1 | 3/2013 | Wong et al. |
| 2013/0151434 A1* | 6/2013 | Chandaria ............. G06Q 10/08 |
| | | 705/333 |
| 2013/0233922 A1 | 9/2013 | Schoening et al. |
| 2013/0249943 A1 | 9/2013 | Chen et al. |
| 2013/0278631 A1 | 10/2013 | Border et al. |
| 2014/0108136 A1* | 4/2014 | Zhao .................. G06Q 30/0252 |
| | | 705/333 |
| 2014/0114530 A1 | 4/2014 | Fitch et al. |
| 2014/0175165 A1 | 6/2014 | Havens et al. |
| 2014/0214619 A1* | 7/2014 | Cancro ................ G06Q 10/083 |
| | | 705/26.61 |
| 2014/0225916 A1 | 8/2014 | Theimer et al. |
| 2014/0253591 A1* | 9/2014 | Hayakawa ............ G06T 19/006 |
| | | 345/633 |
| 2014/0258052 A1 | 9/2014 | Khuti et al. |
| 2014/0304103 A1 | 10/2014 | Barton et al. |
| 2014/0310001 A1 | 10/2014 | Kalns et al. |
| 2014/0348384 A1 | 11/2014 | Kolehmainen |
| 2015/0063676 A1 | 3/2015 | Lloyd et al. |
| 2015/0073907 A1 | 3/2015 | Purves et al. |
| 2015/0130592 A1 | 5/2015 | Lakshminarayanan et al. |
| 2015/0210199 A1 | 7/2015 | Payne |
| 2015/0220055 A1 | 8/2015 | Waisman |
| 2015/0290795 A1 | 10/2015 | Oleynik |
| 2015/0309316 A1 | 10/2015 | Osterhout et al. |
| 2016/0019497 A1 | 1/2016 | Carvajal |
| 2016/0027095 A1 | 1/2016 | Boer et al. |
| 2016/0042318 A1 | 2/2016 | Goodman et al. |
| 2016/0171777 A1 | 6/2016 | Todeschini et al. |
| 2016/0189087 A1 | 6/2016 | Morton et al. |
| 2016/0275441 A1 | 9/2016 | Barber et al. |
| 2016/0307148 A1 | 10/2016 | Jones et al. |
| 2016/0316322 A1 | 10/2016 | Gillen |
| 2016/0371553 A1 | 12/2016 | Farnham et al. |
| 2017/0015502 A1 | 1/2017 | Engel et al. |
| 2017/0039511 A1 | 2/2017 | Corona et al. |
| 2017/0069135 A1 | 3/2017 | Komaki et al. |
| 2017/0083862 A1 | 3/2017 | Loubriel |
| 2017/0108577 A1 | 4/2017 | Loverich et al. |
| 2017/0114992 A1 | 4/2017 | Dodworth |
| 2017/0124396 A1 | 5/2017 | Todeschini et al. |
| 2017/0140329 A1 | 5/2017 | Bernhardt et al. |
| 2017/0193428 A1 | 7/2017 | Abrams et al. |
| 2017/0200217 A1 | 7/2017 | Huseth et al. |
| 2017/0220982 A1 | 8/2017 | Gillen et al. |
| 2017/0243160 A1 | 8/2017 | Bolton |
| 2017/0249745 A1 | 8/2017 | Fiala |
| 2017/0262798 A1 | 9/2017 | Kosseifi et al. |
| 2017/0262910 A1 | 9/2017 | Allen et al. |
| 2017/0323259 A1 | 11/2017 | Gillen et al. |
| 2017/0323376 A1 | 11/2017 | Glaser et al. |
| 2017/0324841 A1 | 11/2017 | Clement et al. |
| 2017/0372159 A1 | 12/2017 | Schimmel |
| 2018/0005446 A1* | 1/2018 | Elazary ..................... G06T 7/70 |
| 2018/0012161 A1 | 1/2018 | Shust et al. |
| 2018/0029083 A1 | 2/2018 | Farlotti |
| 2018/0068266 A1 | 3/2018 | Kirmani et al. |
| 2018/0089616 A1 | 3/2018 | Jacobus et al. |
| 2018/0122118 A1 | 5/2018 | Dotterweich et al. |
| 2018/0122119 A1 | 5/2018 | Dotterweich et al. |
| 2018/0137453 A1 | 5/2018 | Gillen |
| 2018/0247255 A1 | 8/2018 | Jones et al. |
| 2018/0311704 A1 | 11/2018 | Gil |
| 2018/0350093 A1 | 12/2018 | Sweet et al. |
| 2018/0373327 A1 | 12/2018 | Todeschini |
| 2019/0107411 A1 | 4/2019 | Gil |
| 2019/0122174 A1 | 4/2019 | Gil |
| 2019/0124487 A1 | 4/2019 | Jones et al. |
| 2019/0156316 A1 | 5/2019 | Simske et al. |
| 2019/0182355 A1 | 6/2019 | Clement et al. |
| 2019/0220682 A1 | 7/2019 | Schimmel |
| 2019/0303848 A1 | 10/2019 | Schoening |
| 2020/0013011 A1 | 1/2020 | Kashi et al. |
| 2020/0111050 A1 | 4/2020 | Luu et al. |
| 2020/0111246 A1 | 4/2020 | Dotterweich et al. |
| 2020/0118079 A1 | 4/2020 | Lafrance |
| 2020/0120308 A1 | 4/2020 | McMillan et al. |
| 2020/0209342 A1 | 7/2020 | Loverich et al. |
| 2020/0218923 A1 | 7/2020 | Schimmel |
| 2020/0250610 A1 | 8/2020 | Schoening |
| 2020/0283229 A1 | 9/2020 | Edwards et al. |

(56) References Cited

U.S. PATENT DOCUMENTS

| | | |
|---|---|---|
| 2020/0294336 A1 | 9/2020 | Levy |
| 2021/0049846 A1 | 2/2021 | Kashi et al. |
| 2021/0383310 A1 | 12/2021 | Gillen |
| 2022/0050166 A1 | 2/2022 | Loverich et al. |
| 2024/0394652 A1* | 11/2024 | Chakravarty ......... G06T 19/003 |
| 2025/0180369 A1* | 6/2025 | Gurgul ............... G06Q 10/0838 |

FOREIGN PATENT DOCUMENTS

| | | |
|---|---|---|
| EP | 1128315 A1 | 8/2001 |
| EP | 2876059 A1 | 5/2015 |
| FR | 2676941 A1 | 12/1992 |
| JP | 56-004870 A | 1/1981 |
| JP | 2017-007866 A | 1/2017 |
| WO | 96/12931 A1 | 5/1996 |
| WO | 98/32545 A1 | 7/1998 |
| WO | 00/52563 A1 | 9/2000 |
| WO | 00/59648 A2 | 10/2000 |
| WO | 00/59649 A1 | 10/2000 |
| WO | 03/50626 A1 | 6/2003 |
| WO | 2015/099890 A2 | 7/2015 |
| WO | 2017/074989 A1 | 5/2017 |
| WO | 2017/079006 A1 | 5/2017 |
| WO | 2021/042293 A1 | 3/2021 |

OTHER PUBLICATIONS

"Smart Glasses for Warehouses: SmartPick," by Ted Burnham, Apr. 1, 2015 (Year: 2015).*

"Ubimax turns Science-Fiction into Reality," by Former Member, Nov. 24, 2015 (Year: 2015).*

"UPS Puts RFID to the Test," InformationWeek, Nov. 23, 2004 (Year: 2004).

Gartner's Top 10 Near-Term Predictions for Tech, Oct. 21, 2016, Patrick Thibodeau, Computerworld, 5 pages, http://www.computerworld.com/article/3133528/emerging-technology/by-2020-youll-say-more-to-a-machine-than-to-your-spouse.html, Oct. 18, 2017.

Gillen et al., "U.S. Appl. No. 15/349,189, filed Nov. 11, 2016, titled "Remote Initiation of Interaction by a Computing Entity"", 100 pages.

How IoT Logistics Will Revolutionize Supply Chain Management, Dec. 21, 2016, Andrew Meola, Business Insider, 4 pages, http://www.businessinsider.com/internet-of-things-logistics-supply-chain-management-2016-10, Oct. 18, 2017.

Remote Initiation of Interaction by a Computing Entity, Nov. 11, 2016, U.S. Appl. No. 15/349,189.

Smart Drop Box, Jan. 12, 2017, U.S. Appl. No. 62/445,294.

Smart-Packaging Market to Reach $26.7 Billion by 2024, Dec. 1, 2016, CSCMP's Staff, Supply Chain Quarterly, 3 pages, http://www.supplychainquarterly.com/news/20161020-smart-packaging-market-to-reach-267-billion-by-2024/?utm_content=35925246&utm_medium=social&utm_source=twitter, Oct. 18, 2017.

Chung et al., "Postrack: A Low Cost Real-Time Motion Tracing System for VR Application", IEEE Computer Society, USA, 2001, pp. 383-392.

Funk et al., "Mobile In-Situ Pick-by-Vision: Order Picking Support using a Projector Helmet", PETRA, Jun. 29 - Jul. 1, 2016, 4 pages.

Funk et al., "Pick from Here !- An Interactive Mobile Cart using In-Situ Projection for Order Picking", UbiComp 2015, Sep. 7-11, 2015, pp. 601-609.

Goodrich, Ryan, "Accelerometers: What They Are & How They Work", Live Science; Available online at: < https:// www.livescience.com/40102-accelerometers.html>, Oct. 1, 2013, 3 pages.

International Search Report and Written Opinion received for PCT Patent Application No. PCT/US2004/006735, mailed on Aug. 25, 2004, 12 pages.

International Search Report and Written Opinion received for PCT Patent Application No. PCT/US2004/043264, mailed on Sep. 21, 2005, 15 pages.

International Search Report and Written Opinion received for PCT Patent Application No. PCT/US2005/003779, mailed on Jun. 1, 2005, 11 pages.

Internetnews.com, "HP: Sensor Networks Next Step for RFID", Available online at: <http://www.internetnews.com/ent-news/article.php/3426551>, Accessed on Mar. 16, 2005, pp. 1-4.

Li et al., "Evaluation of a Mobile Projector-Based Indoor Navigation Interface", Interacting with Computers, vol. 26, No. 6, Nov. 6, 2013, pp. 595-613.

Mcfarlane et al., "Interactive Dirt Increasing Mobile Work Performance with a Wearable Projector-Camera System", UbiComp 2009, Sep. 30 - Oct. 3, 2009, pp. 205-214.

Michel, Circuit Judge, Winner Int'l Royalty Corp. v. Wang; 202 F.3d 1340, 53 U.S.P.Q.2d 1580 (No. 98-1553, Fed. Cir., Jan. 27, 2000); 12 pages.

Mistry et al., "WUW - Wear ur World - A Wearable Gestural Interface", Proceedings of the 27th International Conference Extended Abstracts on Human Factors in Computing Systems - Chi Ea '09, Apr. 4-9, 2009, 6 pages.

Ota et al., "A Method for Wearable Projector Selection that Considers the Viewability of Projected Images", ACM Computers in Entertainment, vol. 8, No. 3, Article 17, Dec. 2010, 16 pages.

Sakata et al., "Visual Assist with a Laser Pointer and Wearable Display for Remote Collaboration", International Proceedings of 2nd International Conference on Collaboration Technologies, 2006, pp. 66-71.

Syberfeldt et al., "Augmented Reality Smart Glasses in the Smart Factory: Product Evaluation guidelines and Review of Available products", IEEE Access, May 2017, 13 pages.

Verbex.com, "Verbex Speech Commander™ Portable . .. Continuous Speech Recognizer for Mobile Computing" Product Features and Specifications, 3 pages.

Yamada Yasuo, Inventor, Nippondenso Co. Ltd, Applicant; "Optical Information Reader [Abstract Only]," Patent Abstracts of Japan, Publication, 1 page.

* cited by examiner

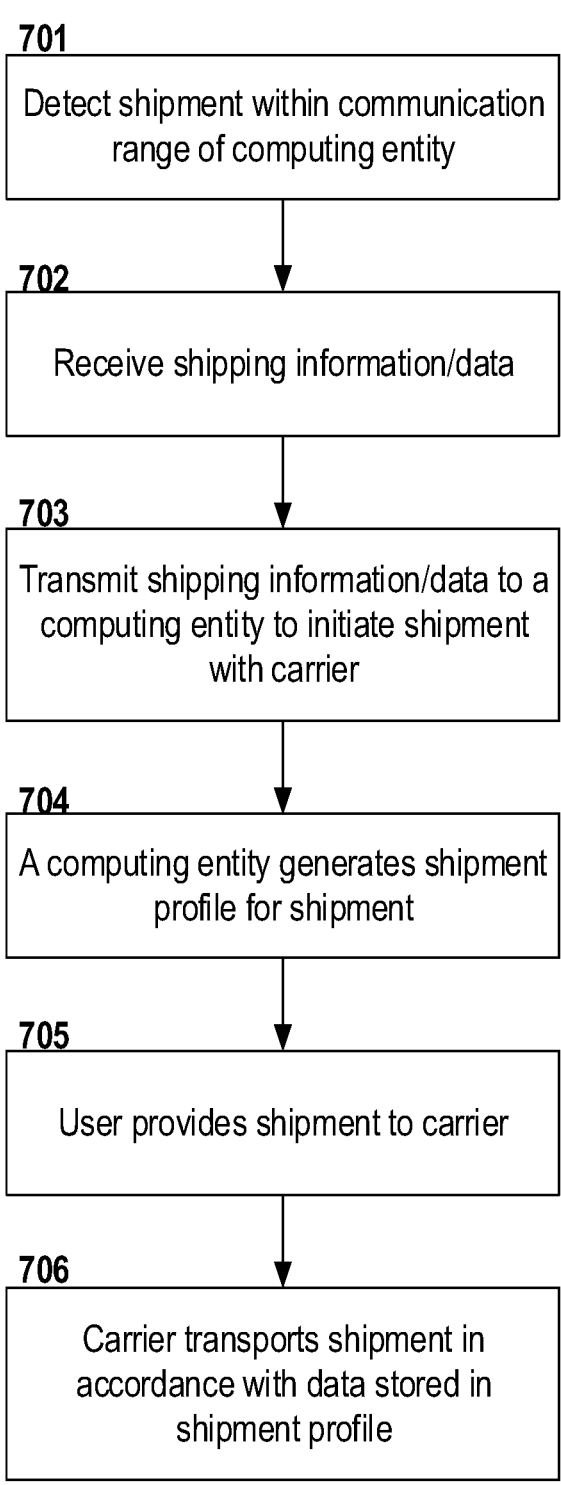

701

Detect shipment within communication range of computing entity

702

Receive shipping information/data

703

Transmit shipping information/data to a computing entity to initiate shipment with carrier

704

A computing entity generates shipment profile for shipment

705

User provides shipment to carrier

706

Carrier transports shipment in accordance with data stored in shipment profile

FIG. 7

ELECTRONICALLY CONNECTABLE PACKAGING SYSTEMS CONFIGURED FOR SHIPPING ITEMS

CROSS-REFERENCE TO RELATED APPLICATIONS

This application is a continuation of U.S. patent application Ser. No. 18/465,660 filed Sep. 12, 2023, which is a continuation of U.S. patent application Ser. No. 17/412,514, filed Aug. 26, 2021, now U.S. Pat. No. 11,803,803, issued Oct. 31, 2023, which is a continuation of U.S. patent application Ser. No. 15/623,989, filed Jun. 15, 2017, now U.S. Pat. No. 11,120,389, issued Sep. 14, 2021, which claims priority to provisional patent application Ser. No. 62/422,183 filed Nov. 15, 2016, all of which are herein incorporated by reference in their entirety.

BACKGROUND OF THE INVENTION

Shippers, consignees, and carriers desire constant improvements to shipping services. For example, shipper's desire additional service options that facilitate shipment initiation and lower shipping costs, and consignees desire additional service options enabling increased shipment/item visibility during shipment from the shipper to the consignee. Similarly, carriers desire additional visibility within their own shipping networks and desire technologies that lower shipping and transportation costs. Accordingly, a need constantly exists for additional shipment related technologies for improving the shipping experience for shippers, consignees, and carriers.

BRIEF SUMMARY OF THE INVENTION

Various embodiments are directed to shipments/items having non-transitory memory, power supplies, and/or integrated wireless network receivers and/or transmitters collectively configured to electronically communicate with one or more computing entities (e.g., carrier computing entities, mobile computing entities, artificial intelligence computing entities, augmented reality computing entities, and/or the like) to enable information/data specific to a particular shipment/item to be presented to a user and/or updated via one or more external computing entities.

Additional embodiments are directed to modular shipments/items that may be configured to be physically split into a plurality of child shipments/items during a shipment process. In various embodiments, a modular shipment/item may be placed into a carrier's transportation network at an origin, and may be split into a plurality of child shipments/items each destined for separate final destinations. Such modular shipments/items may comprise one or more non-transitory memories, power supplies, electronic switches, wireless network receivers and/or transmitters collectively configured to store shipment/item specific information/data thereon. In various embodiments, the modular shipment/item may be configured to self-recognize when one or more child shipments/items are removed from the modular shipment/item, such that each child shipment/item may begin operating as a stand-alone shipment/item, and information/data relating to the modular shipment/item may be updated to reflect a change in the number of connected shipments/items.

Various embodiments are directed to methods for collecting shipment/item information/data for an electronically connected shipment/item via a computing entity. The method may comprise detecting, via a wireless communication component of a computing entity, the electronically connected shipment/item positioned within a communication range surrounding the computing entity; upon detecting the electronically connected shipment/item, initializing executable instructions stored within a non-transitory memory of the computing entity. In certain embodiments, the executable instructions are for: storing a shipment identifier transmitted from the electronically connected shipment/item; requesting shipment/item information/data associated with the electronically connected shipment/item; storing at least a portion of the requested shipment/item information/data in association with the shipment identifier; and transmitting the stored portion of the requested shipment/item information/data and the shipment identifier to a carrier computing entity to cause the carrier computing entity to generate a shipment profile for the shipment/item.

Moreover, certain embodiments are directed to computing entities for collecting shipment information/data for an electronically connected shipment/item. The computing entity may comprise one or more non-transitory memory storage areas; at least one wireless communication component; one or more sensing components each configured to receive shipment information/data; and one or more processors. In certain embodiments, the computing entity is configured to detect, via the wireless communication component, the electronically connected shipment/item positioned within a communication range surrounding the computing entity; upon detecting the electronically connected shipment/item, initialize executable instructions stored within the one or more non-transitory memory storage areas for: storing a shipment identifier transmitted from the electronically connected shipment/item; requesting shipment/item information/data associated with the electronically connected shipment/item; storing at least a portion of the requested shipment/item information/data in association with the shipment identifier; and transmitting the stored portion of the requested shipment/item information/data and the shipment identifier to a carrier computing entity to cause the carrier computing entity to generate a shipment profile for the shipment/item.

Certain embodiments are directed to a computer program product comprising at least one non-transitory computer-readable storage medium having computer-readable program code portions stored therein. The computer-readable program code portions may comprise: an executable portion configured to detect the presence of an electronically connected shipment/item within a communication range of a computing entity based at least in part on signals received from one or more wireless communication components of the computing entity; an executable portion configured to store a shipment identifier transmitted from the electronically connected shipment/item; an executable portion configured to request shipment/item information/data associated with the electronically connected shipment/item; an executable portion configured to store at least a portion of the requested shipment/item information/data in association with the shipment identifier; and an executable portion configured to transmit the stored portion of the requested shipment/item information/data and the shipment identifier to a carrier computing entity to cause the carrier computing entity to generate a shipment profile for the shipment/item.

Various embodiments are directed to a modular shipment/item comprising a plurality of child shipments/items that may be directed to separate destination locations after the modular shipment/item enters a carrier's logistics network. In certain embodiments, the modular shipment/item comprises: a plurality of child shipments/items detachably secured relative to one another, wherein each of the child shipments/items is configured to enclose an item for shipping; and an electrical circuit for monitoring the identity of child shipments/items secured relative to the modular shipment/item, the electrical circuit comprising a plurality of electrical contacts, wherein each child shipment/item has at least one electrical contact disposed therein and wherein the electrical circuit defines a plurality of parallel electric circuits through the plurality of electrical contacts, wherein at least one of the plurality of parallel electric circuits remains closed upon removal of one or more child shipments/items from the modular shipment/item. In various embodiments, the child shipments/items are ranked within the modular shipment/item, and a highest ranking child shipment/item that remains connected with the modular shipment/item provides a wireless communication interface with various computing entities.

Moreover, certain embodiments are directed to an augmented reality computing system for presenting shipment/item information/data to a user. The augmented reality computing system comprises: one or more non-transitory memory storage areas; one or more processors; one or more wireless information connection interfaces (e.g., a camera, an RFID reader, and/or the like); and a display. In various embodiments, the wireless information connection interface is configured to receive shipment/item information/data from a plurality of shipments/items within a field of view of the wireless connection interface, and to collect an image of an environment including at least a portion of the plurality of shipments/item; the one or more processors are configured to analyze the collected image to detect unique visual identifiers on each of one or more shipments/items; compare the unique visual identifiers against the shipment/item information/data to identify a match between portions of the received shipment/item information/data and portions of the image; and to generate, via the display, an augmented display comprising the collected image and overlaid portions of the shipment/item information/data proximate a displayed corresponding unique identifier. In certain embodiments, the shipment/item information/data may be stored in a memory storage device secured to a corresponding shipment/item, and the shipment/item may be configured to transmit the shipment/item information/data to the augmented reality computing system. Moreover, in certain embodiments, the unique visual identifiers may comprise unique symbols on an exterior surface of the shipments/items, and wherein the shipment/item information/data comprises information/data identifying the unique visual identifier associated with the shipment/item information/data.

BRIEF DESCRIPTION OF THE SEVERAL VIEWS OF THE DRAWING

Reference will now be made to the accompanying drawings, which are not necessarily drawn to scale, and wherein:

FIG. 7 is a flowchart illustrating steps for automatically initiating shipment via a computing entity in accordance with certain embodiments of the present invention.

DETAILED DESCRIPTION OF THE INVENTION

Figure 1:
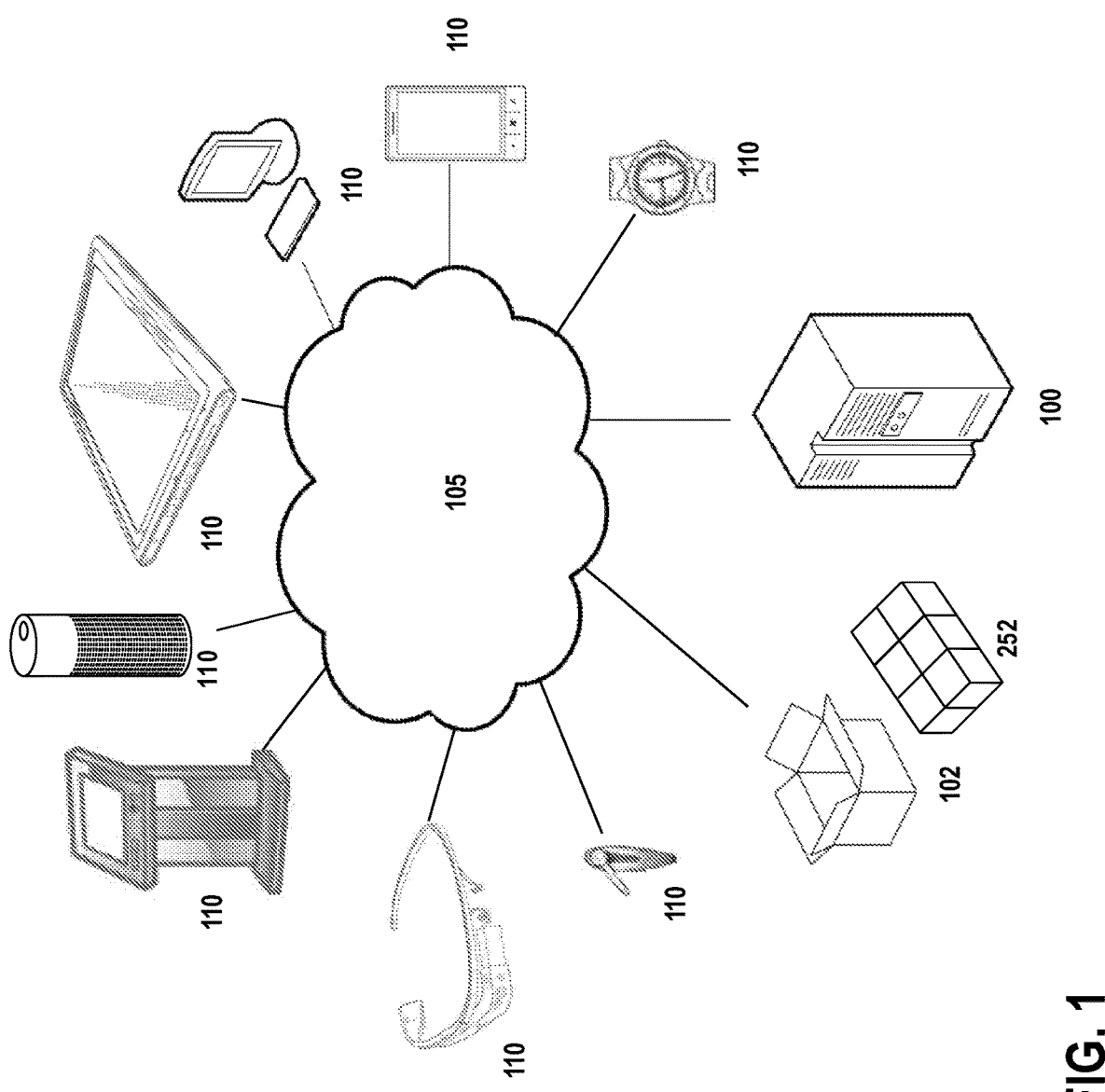
FIG. 1 is a diagram of a system that can be used to practice various embodiments of the present invention.

The present invention will now be described more fully hereinafter with reference to the accompanying drawings, in which some, but not all embodiments of the invention are shown. Indeed, the invention may be embodied in many different forms and should not be construed as limited to the embodiments set forth herein. Rather, these embodiments are provided so that this disclosure will satisfy applicable legal requirements. Like numbers refer to like elements throughout.

Various embodiments are directed to a network-connectable shipments/items (e.g., shipment/item packaging) having integrated electronic computing components, such as a non-transitory memory storage area, a power supply (e.g., a printed battery, a lithium battery, an inductive power-supply configured to provide power when placed near an inductive power source, and/or the like), one or more network communication entities, a location determining device, and/or the like. The shipment/item may be configured to electronically communicate (e.g., automatically) with one or more external computing entities (e.g., carrier computing entities, mobile computing entities, artificial intelligence computing entities, augmented reality computing entities, and/or the like) to provide and/or receive information/data corresponding to the shipment/item and/or a designated shipping service assigned for the shipment/item (e.g., a destination location, a service level, a return address, and/or the like). In various embodiments, the shipment/item may store shipment/item specific identifying information/data (e.g., a unique shipment/item identifier) that may be associated with a corresponding shipment/item profile stored in association with a carrier computing entity. Accordingly, information/data specific to the shipment/item may be updated and/or accessed based on the unique shipment/item identifier information/data stored in association with the shipment/item. Accordingly, external computing entities may receive the unique shipment/item identifier information/data from the shipment/item, and communicate with the carrier computing entity to retrieve additional information/data regarding the shipment/item and/or to provide updated information/data for the shipment/item.

As a specific example, an artificial intelligence ("AI") computing entity located at a shipper location may detect a network-connectable shipment/item nearby (e.g., within a communication range of the AI computing entity), and may automatically initiate a shipping process for the shipment/item. The AI computing entity may request additional shipment/item information/data from the shipper (e.g., via a voice-assistant, a display device, a visual sensor (e.g., a camera) and/or the like) and may update the shipment/item profile stored in association with the carrier computing entity by communicating the additional shipment/item information/data received from the shipper together with the unique shipment/item identifier retrieved from the shipment/item.

As yet another specific example, an Augmented Reality ("AR") computing entity may be configured to receive shipment/item specific information/data and to provide an augmented display providing additional information/data regarding one or more shipments/items. For example, the AR computing entity may be configured to capture image information/data (e.g., still-image information/data and/or video image data) of one or more shipments/items and to capture unique shipment/item identifier information/data for the one or more shipments/items. The AR computing entity may be configured to correlate the received unique shipment/item identifier information/data with specific portions of the captured image information/data corresponding to each of a plurality of shipments/items, and to generate an augmented display for a user providing the captured image information/data together with information/data corresponding to particular shipments/items located over and/or otherwise proximate portions of the image information/data corresponding to the shipments/items. Thus, the augmented display may provide additional information/data regarding specific shipments/items, such as the contents of specific shipments/items over a portion of the image information/data corresponding to those shipments/items.

As discussed herein, additional embodiments are directed to modular shipments/items configured to be split into a plurality of child shipments/items during a shipment process. Accordingly, a plurality of child shipments/items may be detachably secured relative to one another to create a modular (parent) shipment/item. A shipper may ship a modular shipment/item to a particular destination (which may be a particular region (e.g., a zip code), a particular carrier sort location, and/or the like) and may provide updated information/data to the carrier to redirect one of the plurality of child shipments/items to a different destination location while the modular shipment/item is travelling within the carrier transportation network. The child shipment/item may be physically detached from the remaining shipments/items forming the modular shipment/item, and the child shipment/item may be redirected to a final destination location. For example, the child shipment/item may be redirected according to various embodiments discussed in co-pending U.S. patent application Ser. No. 14/859,766, filed Sep. 21, 2015 and incorporated herein by reference in its entirety.

In various embodiments, the modular shipment/item (and the incorporated child shipment/items) may comprise one or more electronic computing components as discussed herein. In various embodiments, the modular shipment/item may comprise one or more electronic switches incorporated therein and configured to determine when a child shipment/item is detached therefrom. Accordingly, the modular shipment/item may be configured to self-monitor the number of connected child shipments/items, and to automatically activate a child shipment/item as a standalone shipment/item when detached.

I. Computer Program Products, Methods, and Computing Entities

Embodiments of the present invention may be implemented in various ways, including as computer program products that comprise articles of manufacture. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM)), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAIVI), double information/data rate synchronous dynamic random access memory (DDR SDRAIVI), double information/data rate type two synchronous dynamic random access memory (DDR2 SDRAIVI), double information/data rate type three synchronous dynamic random access memory (DDR3 SDRAM), Rambus dynamic random access memory (RDRAM), Twin Transistor RAM (TTRAIVI), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. However, embodiments of the present invention may also take the form of an entirely hardware embodiment performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

II. Exemplary System Architecture

FIG. 1 provides an illustration of an exemplary embodiment of the present invention. As shown in FIG. 1, this particular embodiment may include one or more carrier computing entities 100, one or more networks 105, and/or one or more user computing entities 110. Each of these components, entities, devices, systems, and similar words used herein interchangeably may be in direct or indirect communication with, for example, one another over the same or different wired or wireless networks. Additionally, while FIG. 1 illustrates the various system entities as separate, standalone entities, the various embodiments are not limited to this particular architecture.

1. Exemplary Carrier Computing Entities

Figure 2:
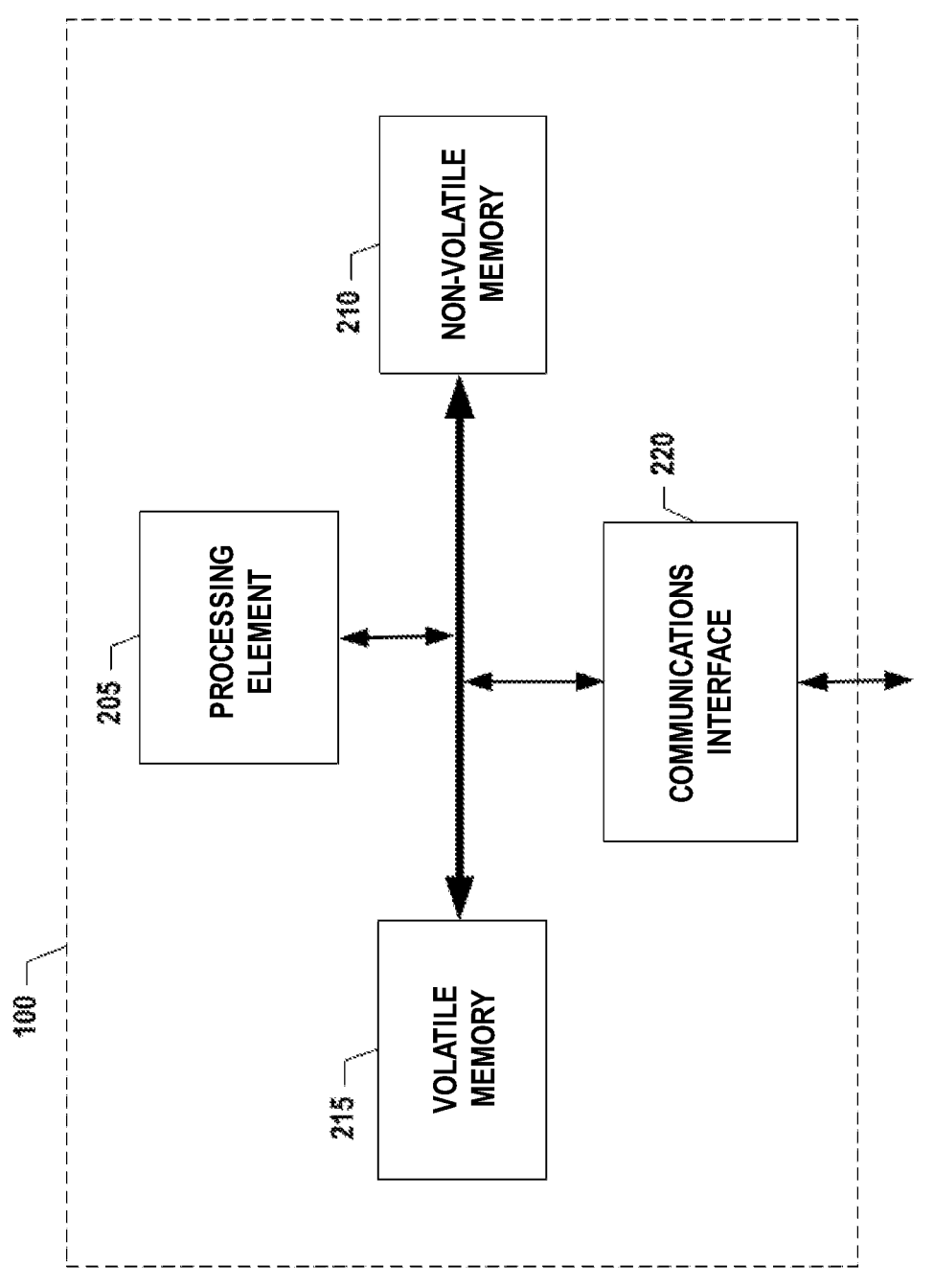
FIG. 2 is a schematic of a carrier computing entity in accordance with certain embodiments of the present invention.

FIG. 2 provides a schematic of a carrier computing entity 100 according to one embodiment of the present invention. A carrier may be a traditional carrier, such as United Parcel Service (UPS), FedEx, DHL, courier services, the United States Postal Service (USPS), Canadian Post, freight companies (e.g. truck-load, less-than-truckload, rail carriers, air carriers, ocean carriers, etc.), and/or the like. However, a carrier may also be a nontraditional carrier, such as Coyote, Amazon, Google, Uber, ride-sharing services, crowd-sourcing services, retailers, and/or the like.

In general, the terms computing entity, computer, entity, device, system, and/or similar words used herein interchangeably may refer to, for example, one or more computers, computing entities, desktops, mobile phones, tablets, phablets, notebooks, laptops, distributed systems, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the carrier computing entity 100 may also include one or more communications interfaces 220 for communicating with various computing entities, such as by communicating data, content, information, and/or similar terms used herein interchangeably that can be transmitted, received, operated on, processed, displayed, stored, and/or the like.

As shown in FIG. 2, in one embodiment, the carrier computing entity 100 may include or be in communication with one or more processing elements 205 (also referred to as processors, processing circuitry, and/or similar terms used herein interchangeably) that communicate with other elements within the carrier computing entity 100 via a bus, for example. As will be understood, the processing element 205 may be embodied in a number of different ways. For example, the processing element 205 may be embodied as one or more complex programmable logic devices (CPLDs), microprocessors, multi-core processors, co-processing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the carrier computing entity 100 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 210, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the non-volatile storage or memory media may store databases (e.g., shipment/item database 40), database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or information/data that is stored in a computer-readable storage medium using one or more database models, such as a hierarchical database model, network model, relational model, entity-relationship model, object model, document model, semantic model, graph model, and/or the like.

In one embodiment, the carrier computing entity 100 may further include or be in communication with volatile media (also referred to as volatile storage, memory, memory storage, memory circuitry and/or similar terms used herein interchangeably). In one embodiment, the volatile storage or memory may also include one or more volatile storage or memory media 215, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the carrier computing entity 100 with the assistance of the processing element 205 and operating system.

As indicated, in one embodiment, the carrier computing entity 100 may also include one or more communications interfaces 220 for communicating with various computing entities, such as by communicating data, content, information, and/or similar terms used herein interchangeably that can be transmitted, received, operated on, processed, displayed, stored, and/or the like. Such communication may be executed using a wired information/data transmission protocol, such as fiber distributed information/data interface (FDDI), digital subscriber line (DSL), Ethernet, asynchronous transfer mode (ATM), frame relay, information/data over cable service interface specification (DOCSIS), or any other wired transmission protocol. Similarly, the carrier computing entity 100 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra wideband (UWB), infrared (IR) protocols, near field communication (NFC) protocols, Wibree, Bluetooth protocols, wireless universal serial bus (USB) protocols, and/or any other wireless protocol.

Although not shown, the carrier computing entity 100 may include or be in communication with one or more input elements, such as a keyboard input, a mouse input, a touch screen/display input, motion input, movement input, audio input, pointing device input, joystick input, keypad input, and/or the like. The carrier computing entity 100 may also include or be in communication with one or more output elements (not shown), such as audio output, video output, screen/display output, motion output, movement output, and/or the like.

As will be appreciated, one or more of the carrier computing entity's 100 components may be located remotely from other carrier computing entity 100 components, such as in a distributed system. Furthermore, one or more of the components may be combined and additional components performing functions described herein may be included in the carrier computing entity 100. Thus, the carrier computing entity 100 can be adapted to accommodate a variety of needs and circumstances. As will be recognized, these architectures and descriptions are provided for exemplary purposes only and are not limiting to the various embodiments.

As discussed herein, the carrier computing entity 100 may be configured to store one or more shipment/item profiles corresponding to shipments/items therein (e.g., in one or more memory storage areas, such as a database). The carrier computing entity 100 may be configured to access and/or update one or more of the shipment/item profiles in response to receipt of information/data for a particular shipment/item, identified according to a unique shipment/item identifier stored in a corresponding shipment/item profile. For example, upon receipt of additional information/data corresponding to a particular shipment/item (e.g., identified based at least in part on the corresponding unique shipment/item identifier), the carrier computing entity 100 may be configured to update the information/data stored in the corresponding shipment/item profile. Moreover, the carrier computing entity 100 may be configured to retrieve and/or provide shipment/item specific information/data stored in the shipment/item profile to one or more computing entities (e.g., mobile computing entities, AI computing entities, AR computing entities, and/or the like) upon receipt of a request for additional information/data corresponding to the shipment/item.

2. Exemplary User Computing Entities

Figure 3:
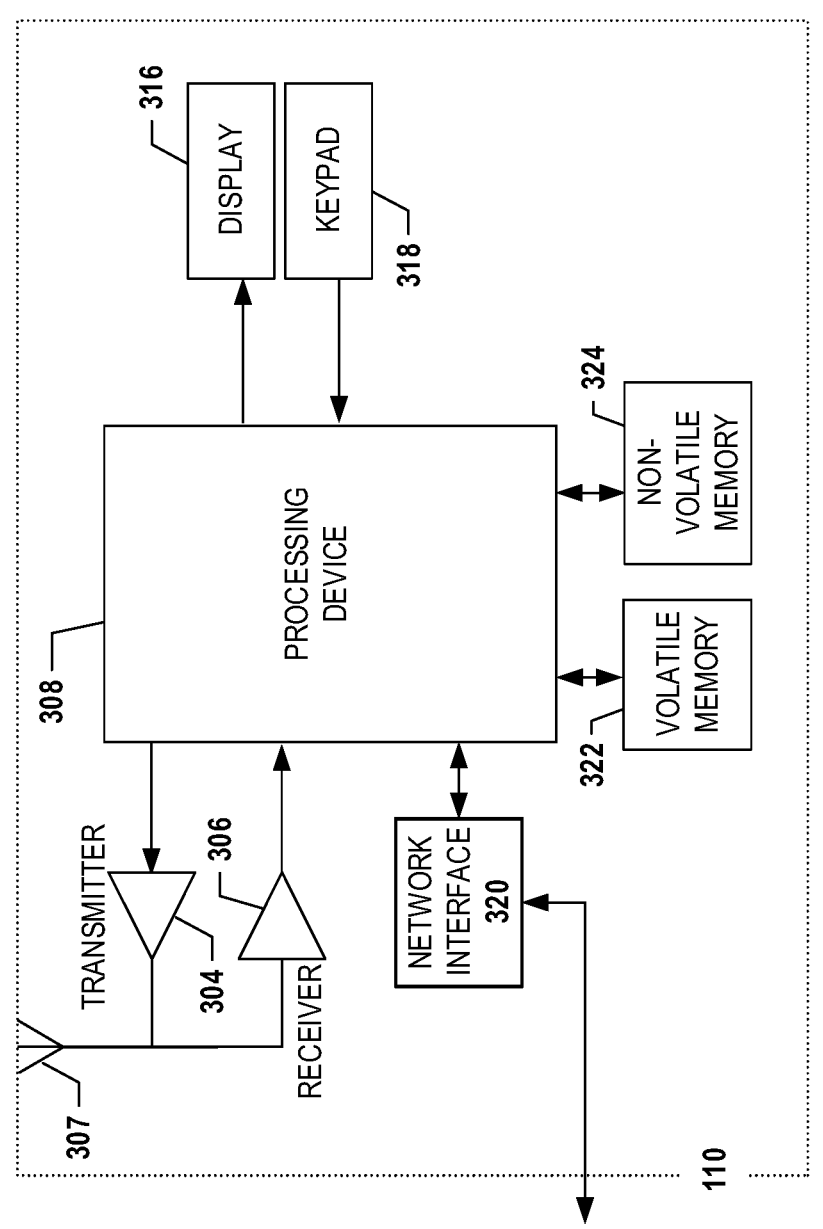
FIG. 3 is a schematic of a user computing entity in accordance with certain embodiments of the present invention.

A user may be an individual, a family, a company, an organization, an entity, a department within an organization, a representative of an organization and/or person, and/or the like—whether or not associated with a carrier. To do so, a user may operate a user computing entity 110 that may include one or more components that are functionally similar to those of the carrier computing entity 100. FIG. 3 provides an illustrative schematic representative of a user computing entity 110 that can be used in conjunction with embodiments of the present invention. In general, the terms device, system, computing entity, entity, and/or similar words used herein interchangeably may refer to, for example, one or more computers, computing entities, desktops, mobile phones, tablets, phablets, notebooks, laptops, distributed systems, gaming consoles (e.g., Xbox, Play Station, Wii), watches, glasses (e.g., Google Glass, HoloLens, Vuzix M-100, SeeThru, Optinvent ORA-S, and the like), key fobs, radio frequency identification (RFID) tags, ear pieces, scanners, cameras, wristbands, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. User computing entities 110 can be operated by various parties, including carrier personnel (sorters, loaders, delivery drivers, network administrators, and/or the like). As shown in FIG. 3, the user computing entity 110 can include an antenna 307, a transmitter 304 (e.g., radio), a receiver 306 (e.g., radio), and a processing element 308 (e.g., CPLDs, microprocessors, multi-core processors, coprocessing entities, ASIPs, microcontrollers, and/ or controllers) that provides signals to and receives signals from the transmitter 304 and receiver 306, respectively.

The signals provided to and received from the transmitter 304 and the receiver 306, respectively, may include signaling information/data in accordance with air interface standards of applicable wireless systems. In this regard, the user computing entity 110 may be capable of operating with one or more air interface standards, communication protocols, modulation types, and access types. More particularly, the user computing entity 110 may operate in accordance with any of a number of wireless communication standards and protocols, such as those described above with regard to the carrier computing entity 100. In a particular embodiment, the user computing entity 110 may operate in accordance with multiple wireless communication standards and protocols, such as UMTS, CDMA2000, 1×RTT, WCDMA, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the user computing entity 110 may operate in accordance with multiple wired communication standards and protocols, such as those described above with regard to the carrier computing entity 100 via a network interface 320.

Via these communication standards and protocols, the user computing entity 110 can communicate with various other entities using concepts such as Unstructured Supplementary Service information/data (US SD), Short Message Service (SMS), Multimedia Messaging Service (MMS), Dual-Tone Multi-Frequency Signaling (DTMF), and/or Subscriber Identity Module Dialer (SIM dialer). The user computing entity 110 can also download changes, add-ons, and updates, for instance, to its firmware, software (e.g., including executable instructions, applications, program modules), and operating system.

According to one embodiment, the user computing entity 110 may include location determining aspects, devices, modules, functionalities, and/or similar words used herein interchangeably. For example, the user computing entity 110 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This information/data can be collected using a variety of coordinate systems, such as the DecimalDegrees (DD); Degrees, Minutes, Seconds (DMS); Universal Transverse Mercator (UTM); Universal Polar Stereographic (UPS) coordinate systems; and/or the like. Alternatively, the location information/data can be determined by triangulating the user computing entity's 110 position in connection with a variety of other systems, including cellular towers, Wi-Fi access points, and/or the like. Similarly, the user computing entity 110 may include indoor positioning aspects, such as a location module adapted to acquire, for example, latitude, longitude, altitude, geocode, course, direction, heading, speed, time, date, and/ or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The user computing entity 110 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the user computing entity 110 to interact with and/or cause display of information/data from the carrier computing entity 100, as described herein. The user input interface can comprise any of a number of devices or interfaces allowing the user computing entity 110 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the user computing entity 110 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The user computing entity 110 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAIVI, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the user computing entity 110. As indicated, this may include a user application that is resident on the entity or accessible through a browser or other user interface for communicating with the carrier computing entity 100 and/or various other computing entities.

In another embodiment, the user computing entity 110 may include one or more components or functionality that are the same or similar to those of the carrier computing entity 100, as described in greater detail above. As will be recognized, these architectures and descriptions are provided for exemplary purposes only and are not limiting to the various embodiments.

In various embodiments, a user computing entity 110 may be embodied as an AI computing entity and/or an AR computing entity. Accordingly, the user computing entity 110 may be configured to provide and/or receive information/data from a user via an input/output mechanism, such as a display, a camera, a speaker, a voice-activated input, and/or the like.

In certain embodiments, an AI computing entity may comprise one or more predefined and executable program algorithms stored within an onboard memory storage module, and/or accessible over a network. In various embodiments, the AI computing entity may be configured to retrieve and/or execute one or more of the predefined program algorithms upon the occurrence of a predefined trigger event. The predefined and executable program algorithms may comprise algorithms for placing an order for one or more items (the items may be predefined as a part of the algorithm or the items may be defined upon the algorithm being executed); algorithms for providing requested information/data (e.g., providing weather information, providing traffic information, and/or the like); algorithms for operating one or more network connected switches (e.g., Wi-Fi enabled light switches); and/or the like.

As a specific example, the one or more algorithms may comprise an algorithm for initiating the shipment of a shipment/item, as discussed in greater detail herein. In such embodiments, the AI computing entity may be configured to initiate the shipment of a shipment/item upon the occurrence of a trigger event, such as the detection of a shipment/item (e.g., a network connected shipment/item) proximate the AI computing entity. Accordingly, the AI computing entity may comprise one or more sensors configured to detect the presence of one or more shipments/items proximate the AI computing entity. For example, the one or more sensors may comprise vision sensors (e.g., a camera), RFID-receivers, BLE-receivers, Wi-Fi receivers, NFC receivers, and/or the like. The one or more sensors may be passive (e.g., configured to receive signals without transmitting signals) or active (e.g., configured to both receive signals and transmit signals). Accordingly, the one or more sensors may be configured to detect the presence of various shipments/items proximate the AI computing entity and/or to transmit information/data to the shipments/items detected to be proximate the AI computing entity.

As noted herein, various computing entities may be embodied as AR computing entities. Like the AI computing entities discussed herein, the AR computing entities may comprise one or more sensors configured to detect the presence of one or more shipments/items proximate the AR computing entity. For example, the one or more sensors may comprise vision sensors (e.g., a camera), RFID-receivers, BLE-receivers, Wi-Fi receivers, NFC receivers, and/or the like. The one or more sensors may be passive (e.g., configured to receive signals without transmitting signals) or active (e.g., configured to both receive signals and transmit signals). Accordingly, the one or more sensors may be configured to detect the presence of various shipments/items proximate the AR computing entity and/or to transmit information/data to the shipments/items detected to be proximate the AR computing entity.

The AR computing entities may be additionally configured to detect a location of various shipments/items (e.g., shipment/items) relative to the location of the AR computing entity. Accordingly, the AR computing entity may be configured to detect a current location of various identified shipments/items.

Moreover, the AR computing entities may be configured to display information/data collected via the one or more sensors (e.g., display an image collected by a camera), and to supplement the displayed information/data with additional information/data regarding one or more shipments/items identified within the display. Accordingly, an AR computing entity refers to any device that projects, superimposes, overlays, or otherwise provides an image on a surface with respect to a user's viewing angle or line of vision or a computing entity's viewing angle. For example, the AR computing entities may be configured to overlay portions of the displayed image with information/data regarding shipments/items indicated within the overlaid portion of the image. As one non-limiting example discussed in greater detail herein, the AR computing entity may be configured to display information/data indicative of an identity of a shipment/item over a portion of an image displaying the shipment/item. Accordingly, the AR computing entity can be used to provide an augmented reality environment/area, a mixed reality environment/area, and/or similar words used herein interchangeably to a user. The terms augmented/mixed environment/area should be understood to refer to a combined environment/area including the physical environment/area and elements of a virtual environment/area.

As discussed herein, the AR computing entity may be configured to detect markers and/or target objects. For example, the AR computing entity may include readers, scanners, cameras, sensors, and/or the like for detecting when a marker and/or target object is within its point-of-view (POV)/field-of-view (FOV) of the real world environment/area. For example, readers, scanners, cameras, sensors, and/or the like may include RFID readers/interrogators to read RFID tags, scanners and cameras to capture visual codes (e.g., text, barcodes, character strings, Aztec Codes, MaxiCodes, information/data Matrices, QR Codes, electronic representations, and/or the like), and sensors to detect beacon signals transmitted from target objects or the environment/area in which target objects are located. For example, the AR computing entity may be embodied as glasses having an incorporated display, for example as described in U.S. Pat. No. 7,063,256, which is hereby incorporated by reference in its entirety. The display may be incorporated within the glasses, within a line of sight between the user and the user's field of view, or the display may be a separate device from the glasses through which the items may be viewed.

In one embodiment, the AR computing entity may include accelerometer circuitry for detecting movement, pitch, bearing, orientation, and the like of the AR computing entity. This information/data may be used to determine which area of the augmented/mixed environment/area corresponds to the orientation/bearing of the AR computing entity (e.g., x, y, and z axes), so that the corresponding environment/area of the augmented/mixed environment/area may be displayed via the display along with a displayed image. For example, the AR computing entity may overlay an image in a portion of the user's POV/FOV of the real world environment/area.

The AR computing entity may also comprise or be associated with an asset indicia reader, device, module, functionality, and/or similar words used herein interchangeably. For example, the AR computing entity may include an RFID tag reader configured to receive information from passive RFID tags and/or from active RFID tags associated with a shipment/item. The AR computing entity may additionally or alternatively include an optical reader configured for receiving information printed on a shipment/item. For example, the optical reader may be configured to receive information stored as a bar code, QR code, or other machine-readable code. The optical reader may be integral to the AR computing entity and/or may be an external peripheral device in electronic communication with the AR computing entity. The optical reader may also or alternatively be configured to receive information stored as human readable text, such as characters, character strings, symbols, and/or the like. The AR computing entity may utilize the asset indicia reader to receive information regarding a shipment/item to be sorted.

3. Exemplary Shipment/Item

A shipment/item 102 may be any tangible and/or physical object. Such shipments/items 102 may be picked up and/or delivered by a carrier/transporter, for example, via one or more carrier service levels, such as Same Day Air, Same Day Ground, Next Day Air, Next Day Ground, Overnight, Express, Next Day Air Early AM, Next Day Air Saver, Jetline, Sprintline, Secureline, 2nd Day Air, Priority, 2nd Day Air Early AM, 3 Day Select, Ground, Standard, First Class, Media Mail, SurePost, Freight, and/or the like. In one embodiment, a shipment/item 102 may be or be enclosed in one or more packages, parcels, bags, containers, loads, crates, items banded together, vehicle parts, pallets, drums, the like, and/or similar words used herein interchangeably. Such shipments/items 102 may include the ability to communicate (e.g., via a chip (e.g., an integrated circuit chip), RFID, NFC, Bluetooth, Wi-Fi, and any other suitable communication techniques, standards, or protocols) with one another and/or communicate with various computing entities for a variety of purposes. For example, the shipment/item 102 may be configured to communicate with one or more devices (e.g., computing entities) located at one or more locations (e.g., a shipper location, a carrier location, and/or a recipient/consignee location) using a short/long range communication technology, as described in co-pending U.S. patent application Ser. No. 15/348,189, filed on Nov. 11, 2016 and incorporated herein by reference in its entirety. Further, such shipments/items 102 may have the capabilities and components of the described with regard to the carrier/transporter computing entities 100, networks 105, vehicles, user computing entities 110, and/or the like. For example, the shipment/item 102 may be configured to store item information/data. In example embodiments, the shipment/item information/data may comprise one or more of a consignee name/identifier, a shipment identifier, a service point (e.g., delivery location/address, pick-up location/address), instructions for delivering the shipment/item, a shipment/item delivery authorization code, information/data regarding if a device is present at the service point (e.g., a recipient location), and/or the like. In this regard, in some example embodiments, a shipment/item may communicate send "to" address information/data, received "from" address information/data, unique identifier codes, and/or various other information/data. In one embodiment, each shipment/item may include a shipment identifier, such as an alphanumeric identifier. Such shipment identifiers may be represented as text, barcodes, tags, character strings, Aztec Codes, MaxiCodes, Data Matrices, Quick Response (QR) Codes, electronic representations, and/or the like. A unique shipment identifier (e.g., 123456789) may be used by the carrier to identify and track the shipment/item as it moves through the carrier's transportation network. Further, such shipment/item identifiers can be affixed to shipments/items by, for example, using a sticker (e.g., label) with the unique shipment/item identifier printed thereon (in human and/or machine readable form) or an RFID tag with the unique shipment/item identifier stored therein.

Figure 4:
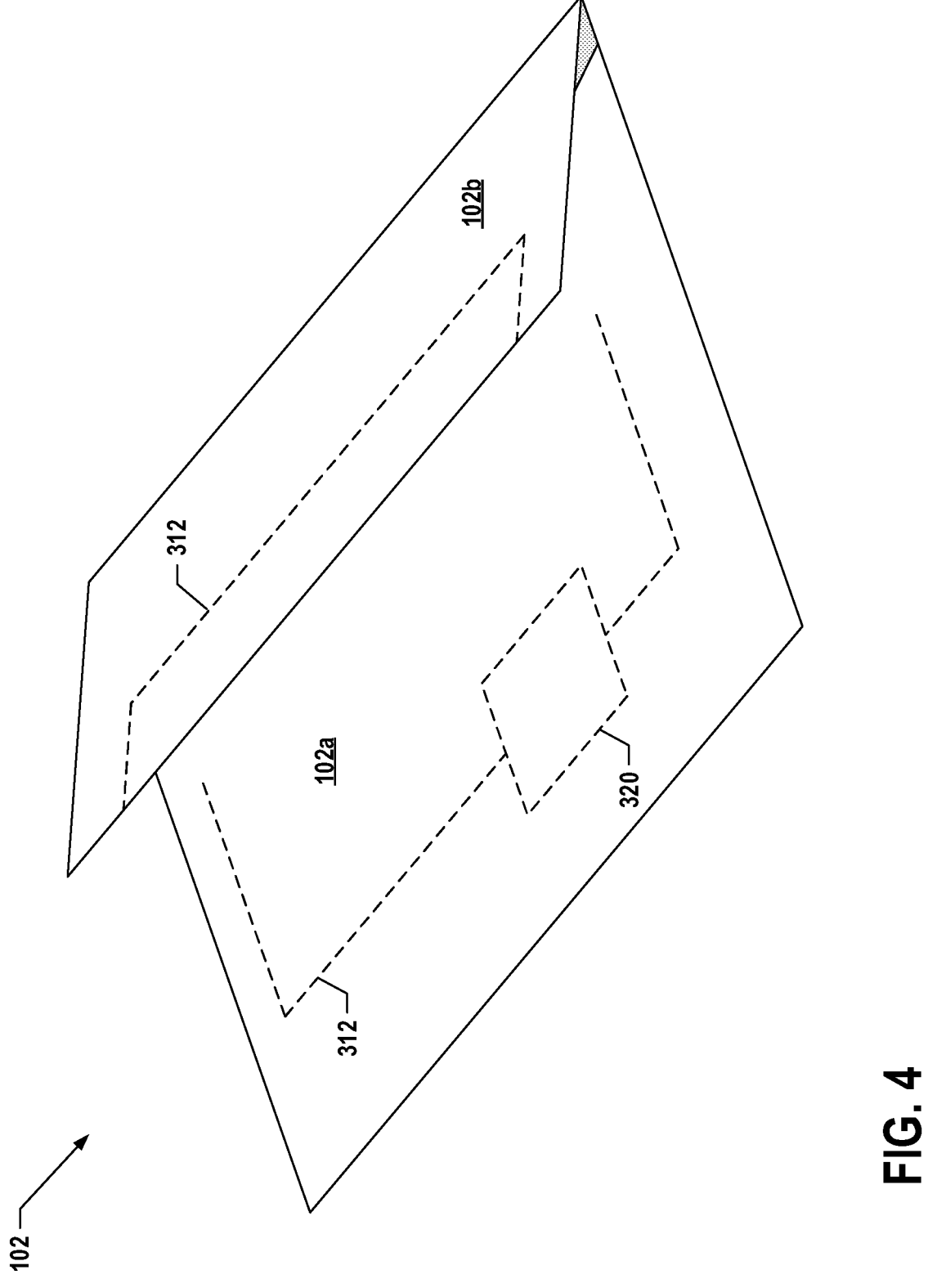
FIG. 4 is a schematic of an electronically connected shipment/item in accordance with certain embodiments of the present invention.

In various embodiments, packaging materials (e.g., boxes, envelopes, padded envelopes, sleeves, and/or the like) utilized for the shipment/item may incorporate the one or more electrical components, including a power supply, therein. The power supply may be embodied as a battery, such as a lithium battery, that may be incorporated into the packaging materials. In certain embodiments, the battery may be printed onto the packaging materials (e.g., as a portion of a printed label). In various embodiments, the one or more electrical components may be configured to automatically activate upon sealing the packaging materials. For example, as shown in FIG. 4, the packaging materials may comprise one or more electronic contacts 312 (e.g., conductors) embedded, printed, and/or the like in one or more portions 102a, 102b of the packaging materials, such that the electronic contacts 312 collectively form a complete, closed circuit with one or more onboard computing components 320 (e.g., batteries, processors, memory storage areas, wireless receivers (e.g., RFID receivers, BLE receivers, Wi-Fi receivers, and/or the like), wireless transmitters (e.g., RFID transmitters (active or passive), BLE transmitters, Wi-Fi transmitters, and/or the like), and/or the like). In certain embodiments, the electronic contacts 312 may comprise printed conductors (e.g., 3-D printed conductors, ink jet printed conductors, and/or the like), such as conductive inks, sintered conductive materials, semi-conductive materials, and/or the like. When the packaging materials are closed, the electronic contacts enable current to flow between the onboard battery and the onboard computing components 320 such that the onboard computing components 320 are active (e.g., able to transmit and/or receive information/data).

As a specific example, the packaging may have a first electronic contact 312 in a first portion 102a of the packaging materials (e.g., a base portion), and a second electronic contact 312 in a second portion 102b of the packaging materials (e.g., a lid portion) pivotably secured relative to the first portion 102a. Individually, each of the first electrical contact 312 and the second electrical contact 312 form individual open circuits, such that current does not flow between electronic components 320 (e.g., computing components, wireless receivers, wireless transmitters, and/or the like) embedded within the first electronic contact 312 and/or the second electronic contact 312. When the packaging materials are sealed such that the first portion 102a is secured against the second portion 102b to seal the packaging materials in a closed configuration, the first electronic contact 312 is in contact with the second electronic contact 312 to form a closed electrical circuit encompassing both the first electronic contact 312 and the second electrical contact 312 to enable current to flow between the one or more onboard computing components 320 embedded within the first portion 102a and/or the second portion 102b. Accordingly, upon sealing the packaging materials and forming a closed circuit encompassing the first electrical contact 312 and the second electrical contact 312, the various electrical components 320 are activated to form a wirelessly connected shipment/item. Although FIG. 4 illustrates the packaging materials as an envelope, it should be understood that various embodiments may comprise a box and/or other forms of packaging materials incorporating similar electronic contacts 312 and electronic components 320.

In certain embodiments, items contained within a shipment/item may be wirelessly connected, and may be configured to provide wireless connectivity functionality for the shipment/item while the shipment/item is being transported by a carrier. For example, an electronic device being shipped may comprise a wireless transmitter (e.g., an RFID tag), a power supply, an on-board memory, and/or the like that may be configured to broadcast shipment/item information/data while the item remains packaged within the shipment/item. In certain embodiments, the wireless connectivity components may be disconnected and/or deactivated once the item is removed from the shipment/item. For example, the wireless connectivity components may be embodied as a separate object placed within the shipment/item (e.g., secured relative to the packaged item); the wireless connectivity components may be embedded within the item; the wireless connectivity components may form a functional part of the item, and the shipment-specific functionality may be deactivated upon removal from the shipment/item, and/or the like.

4. Example Modular Shipment/Item

Figures 5A, 5B:
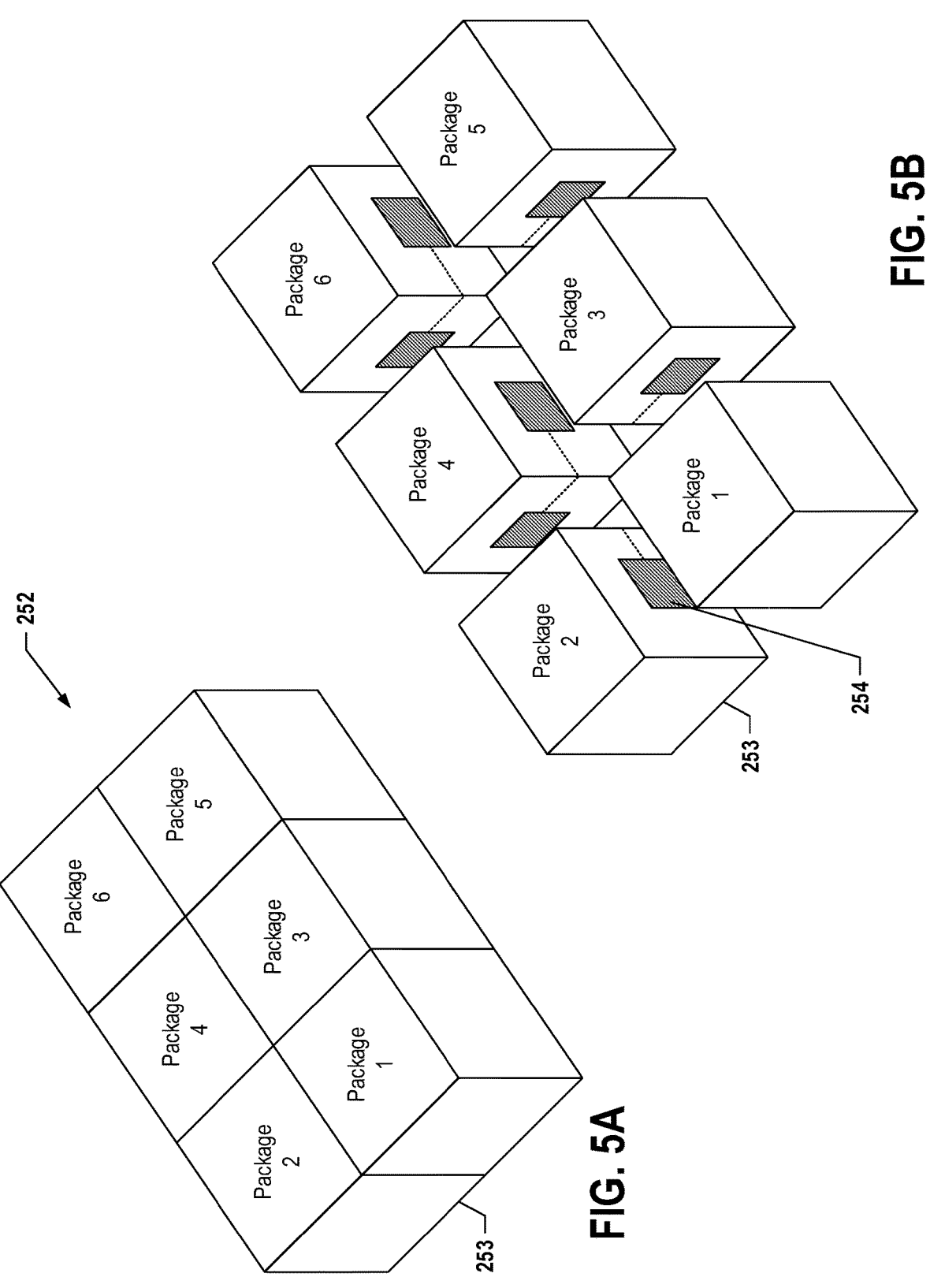
FIGS. 5A-5B are schematics of a modular shipment in accordance with certain embodiments of the present invention.

As discussed herein, various embodiments are directed to modular shipments/items 252 comprising a plurality of child shipments/items 253 that may be selectably detached from the modular shipment/item 252 and sent to corresponding destination locations. Each of the child shipments/items 253 may have a configuration similar to that discussed above. Thus, each child shipment/item may be a connected (or connectable) shipment/item configured to independently establish a wireless connection with one or more computing entities. However, the child shipment/item electronic components (e.g., those components configured to establish wireless communications including the shipment/item) may be selectably operational based on the configuration of the child shipment/item 253 relative to other child shipments/items 253 collectively forming the modular shipment/item 252. FIGS. 5A-5B illustrate an example modular shipment 252 and child shipments 253.

As shown in FIG. 5B, the child shipments/items 253 may each comprise electrical contacts 254 that are connectable relative to other child shipments/items 253 of the modular shipment/item 252 to create an at least substantially continuous electrical communication circuit among all of the child shipments/items 253 of the modular shipment/item 252. In certain embodiments, the child shipments/items 253 of the modular shipment/item may be configured to share information/data via the continuous electrical circuit; to share power (e.g., from one or more power supplies) via the continuous electrical circuit; and/or the like. However, in certain embodiments, the continuous electrical circuit may be monitored by each individual child shipment/item 253 (e.g., via onboard processors of each child shipment/item) to determine whether the child shipment/item 253 is still a part of the modular shipment/item 252. In the latter embodiment, the continuous electrical communication circuit may be utilized as a portion of a switch for each child shipment/item 253 to determine whether the child shipment/item 253 remains a part of a modular shipment/item 252 or whether the child shipment/item 253 is detached from the modular shipment/item 252 such that the child shipment/item 253 operates as a standalone shipment/item. For example, each child shipment/item 253 may comprise one or more electrical components (e.g., batteries, memory storage areas, processors, wireless transmitters, wireless receivers, and/or the like) in an off or standby configuration while the child shipment/item 253 remains attached relative to other child shipments/items 253, and which are automatically activated upon detecting an interruption in the continuous electrical circuit that indicates that the child shipment/item 253 has been disconnected from the modular shipment/item 252.

In various embodiments, the child shipments/items 253 of the modular shipment/item 252 may be assigned a hierarchical ranking utilized to establish which of the interconnected child shipments/items 253 of the modular shipment/item 252 provide wireless connectivity for the modular shipment/item 252. The hierarchical ranking ensures that only a single child shipment/item 253 is utilized to establish wireless connectivity for the modular shipment/item 252, such that the modular shipment/item 252 need not comprise separate wireless connectivity components for modular shipment/item 252. As a non-limiting example, the child shipment/item 253 having the highest remaining hierarchical ranking is active to provide wireless connectivity for the modular shipment/item 252. As child shipments/items 253 are removed from the modular shipment/item 252 (e.g., to be delivered to corresponding destination locations for the child shipments/items 253), the child shipments/items 253 remaining with the modular shipment/item 252 self-determine the highest ranking remaining child shipment/item 252 to establish wireless connectivity for the modular shipment/item. For example, with reference to FIG. 5A, if child shipments/items 1, 3, and 5 (indicated by "Package" numbers on each representative child shipment/item 253) are all removed from the modular shipment/item 252, the highest ranking remaining child shipment/item 253 would be shipment/item 2. Accordingly, package 2 would provide wireless connectivity for the modular shipment/item 252. If package 2 is subsequently removed, package 2 would continue to be wirelessly connected, however it would operate as a standalone shipment/item, and package 4 would become active to provide wireless connectivity for the modular shipment/item 252.

To identify the highest ranking remaining child shipment/item 253, the plurality of child shipments/items 253 remaining secured to the modular shipment/item 252 may each comprise one or more sensors to determine whether each child shipment/item 253 remains connected to the modular shipment/item 252 (e.g., by detecting the continuous electrical circuit established between the various electrical contacts of the various child shipments/items 253) and/or one or more sensors configured to determine whether the modular shipment/item 252 is broadcasting data, for example, from another child shipment/item 253. Accordingly each child shipment/item 253 may be configured to remain in a passive mode to monitor the operation of the modular shipment/item 252 until the child shipment/item 253 determines that it is the highest ranking remaining child shipment/item 253 of the modular shipment/item 252, at which time the child shipment/item 253 becomes active to provide wireless connectivity for the modular shipment/item 252.

III. Example System Operation

As discussed herein, various embodiments are directed to systems and methods for initializing and/or tracking various shipments based on one or more wireless communications established with the shipment/item. For example, various embodiments may be configured to initialize a shipment at least in part by establishing a wireless communication between the shipment/item and a user computing entity (e.g., an AI computing entity). Moreover, various embodiments may be configured to track a current location of a shipment/item based at least in part on established communications between one or more computing entities (e.g., user computing entities operated by various carrier employees). Each of these configurations will be described in greater detail herein.

1. Self-Shipping Shipment/Item

Figure 6:
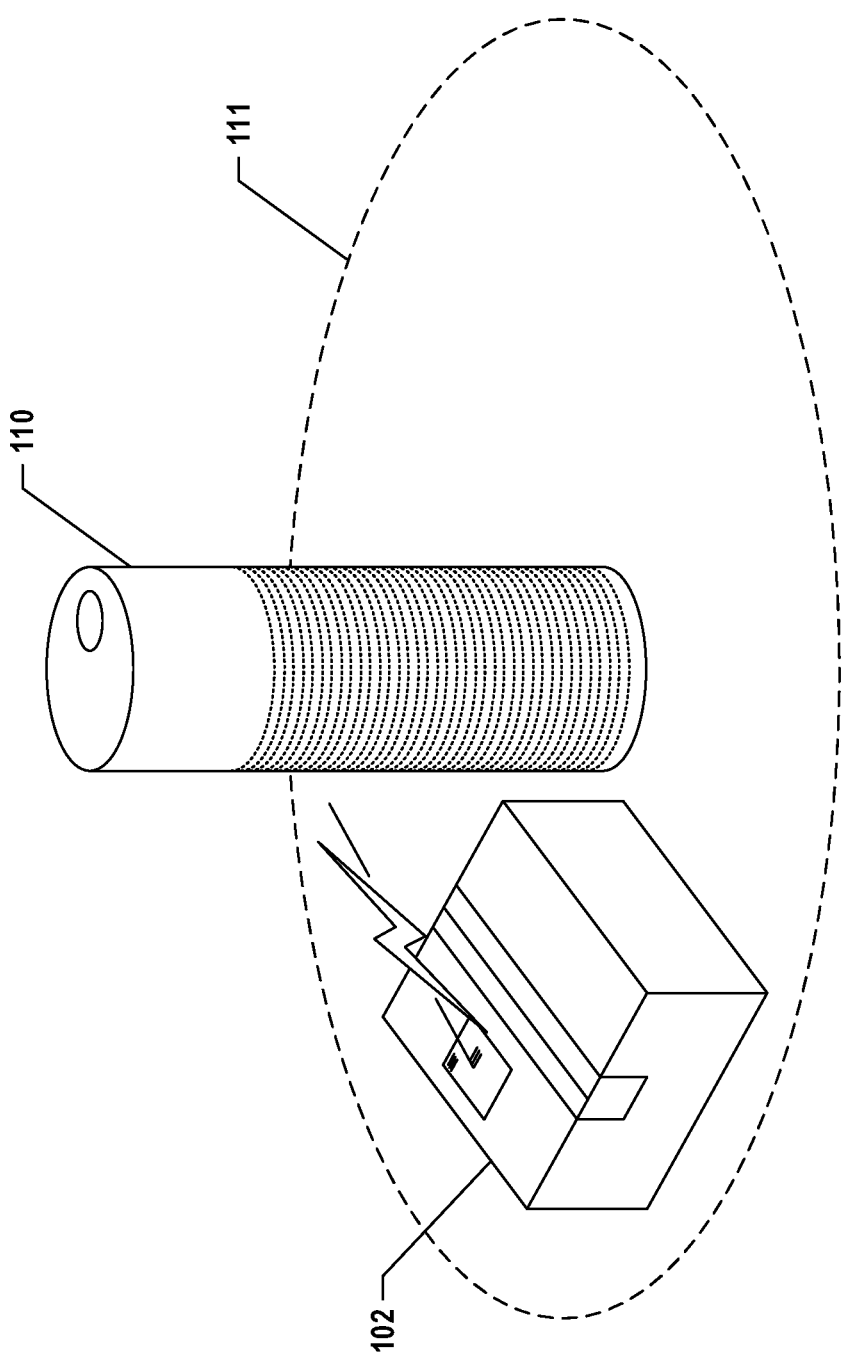
FIG. 6 is a schematic of an electronically connected shipment/item in wireless communication with a computing entity in accordance with certain embodiments of the present invention.

With reference now to FIG. 6, which provides a schematic diagram of the connectivity between a shipment/item 102 and a computing entity 110, various embodiments are directed to systems and methods for self-shipping a shipment/item 102 configured to initiate a shipping process based at least in part on an established wireless communication between the shipment/item 102 and a computing entity 110. Although the following discussion indications that a connected shipment/item 102 may be configured for self-shipment, it should be understood that modular shipments/items 252 may be similarly configured for self-shipment in accordance with the following discussion. FIG. 7 is a flowchart illustrating steps of an example method for self-shipping a shipment/item 102.

As discussed herein, the packaging materials of the shipment/item 102 may comprise one or more network enabled connection components. These network enabled connection components may be configured to become active upon closing and sealing the packaging materials to create a closed circuit among and between computing components and an onboard power source of the packaging materials (e.g., after packaging an item to be shipped in the packaging materials), such that the connected shipment/item 102 begins broadcasting information/data regarding the shipment/item 102 and/or begins searching for wireless networks for connection. In various embodiments, the packaging materials may be preassigned a particular shipment/item identifier (e.g., a tracking number) prior to the packaging materials being sealed. The shipment/item identifier may be printed or otherwise provided on an exterior surface of the packaging materials, and may be predefined within an onboard memory prior to the packaging materials being sealed for shipment. Accordingly, the packaging materials may be configured to broadcast the shipment/item identifier upon becoming active (e.g., upon sealing the shipment/item). For example, upon being brought into a broadcast/communication range 111 of a computing entity 110 (e.g., an AI computing entity), the active shipment/item 102 may broadcast the shipment/item identifier such that the computing entity 110 detects the broadcast data. It should be understood that other shipment/item information/data may be stored within the packaging materials, such as a shipment/item size, a shipment/item type, a maximum shipment/item weight, and/or the like.

In various embodiments, the computing entity 110 (e.g., an AI computing entity) may be configured to detect the presence of a shipment/item 102 upon placement of the shipment/item 102 within a wireless communication range 111 of the computing entity 110 (e.g., upon receipt of broadcast information/data from the shipment/item 102), as shown at Block 701 of FIG. 7, and as indicated schematically in FIG. 6. The detection of the shipment/item 102 may act as a trigger event for the initiation of a predefined algorithm (e.g., embodied as an executable computer program) executable by the computing entity 110 for initiating a shipment process for the shipment/item 102. Accordingly, upon detection of the shipment/item 102 within the transmission range 111 of the computing entity 110, the computing entity 110 may be configured to retrieve and/or execute a predefined algorithm for initiating a shipment process for the shipment/item 102. In various embodiments, the predefined algorithm may be stored locally as an executable program on the computing entity 110, and accordingly the computing entity 110 may be configured to retrieve and execute the program from local memory storage. However, in various embodiments, the detection of a shipment/item 102 may cause the computing entity 110 to generate and transmit a request to a separate memory storage device, such as a database accessible over the Internet, for the executable program for initiating a shipment. The separate memory storage device may be configured to transmit the entirety of the executable program to the computing entity 110 for execution, or the separate memory storage device may be configured to provide executable instructions to the computing entity 110 to execute a plurality of discrete steps separately, the plurality of discrete steps collectively forming the executable program. Accordingly, the executable program may reside locally at the separate memory storage device, and the separate memory storage device may request one or more information/data items from the computing entity during execution of the program.

As shown in FIG. 7, the computing entity 110 may be configured to retrieve shipment/item information/data relevant for initiating shipment of the shipment/item 102, as shown in Block 702. The relevant shipment/item information/data may comprise a ship from location, a ship to location, a requested service level for the shipment/item, and/or the like. In various embodiments, the computing entity 110 may be configured to self-determine various aspects of the relevant shipment/item information/data. For example, the computing entity may be configured to self-determine a ship from location as the current location of the computing entity 110. The current location of the computing entity 110 may be stored locally (e.g., as a shipping address, a residential address, a business address, and/or the like) and/or may be determined by a location determining aspect of the computing entity 110 (e.g., via GPS, via information/data received from one or more networked computing entities (e.g., routers), and/or the like). Moreover, the computing entity 110 may have one or more shipping preferences stored therein and may utilize the shipping preferences to establish other shipment/item information/data, such as a selected service level, a drop-off and/or pick-up preference for the shipment/item 102 (e.g., whether the shipper will drop the shipment/item off at a carrier location or whether the shipper requests that the shipment/item is picked-up by a carrier employee), a payment preference (e.g., a payment account to be utilized to pay for shipping services), and/or the like. The computing entity 110 may be configured to apply the shipping preferences automatically to detected shipments/items 102, although various embodiments enable a user to override the shipping preferences by providing conflicting user input (e.g., via a voice input mechanism). For example, if a stored shipping preference indicates that shipments/items are to be initiated for Next-Day Air Ground shipment, the computing entity 110 may be configured to override the shipping preference upon receipt of user input indicating that a particular detected shipment/item 102 is be shipped via carrier Ground shipping services.

In various embodiments, the computing entity 110 may be configured to request user input regarding other shipment/item information/data, such as a ship to location. The computing entity 110 may be configured to request user input regarding any shipment/item information/data that cannot be directly determined by the computing entity 110. For example, shipment/item information/data not specified in shipping preferences stored on the computing entity 110 or otherwise identifiable/determinable based on information/data available to the computing entity 110 may be requested from the user of the computing entity 110 (e.g., the shipper of the shipment/item). For example, the computing entity 110 may be configured to request user input from a user identifying an intended recipient of the shipment/item 102. As a specific example, the computing entity may be configured to output a series of audio prompts to the user upon detection of the shipment/item 102, wherein these audio prompts request user voice input providing additional information/data about the shipment/item 102. After generating each audio output prompt, the computing entity may be configured to monitor an onboard microphone to receive vocal user input responding to the audio prompt. Accordingly, the computing entity 110 may be configured to initiate an audio-based conversation with a user to request additional information/data about the shipment/item 102. A non-limiting example conversation/dialogue is provided below, beginning when the computing entity 110 detects the presence of a shipment/item proximate the computing entity (e.g., the computing entity detecting shipment/item information/data broadcast from the shipment/item).

> [Computing Entity]: Good morning user, I see you have a shipment/item ready for shipment, would you like me to prepare the necessary paperwork?
>
> [User]: Yes.
>
> [Computing Entity]: OK, where would you like to send the shipment/item?
>
> [User]: Send it to John Smith.
>
> [Computing Entity]: OK, are you referring to the John Smith stored in your contacts? He lives at 123 Main Street, Atlanta, GA 30319.
>
> [User]: Yes.
>
> [Computing Entity]: OK, I'll have someone from Carrier come out tomorrow to pick up the shipment/item and send it via Next-Day Ground to John Smith. Is this OK?
>
> [User]: No, please send it via Express shipping.
>
> [Computing Entity]: OK, I've updated the shipment/item information/data for this shipment/item. It will be picked-up by Carrier tomorrow and sent via Carrier Express to John Smith. Do you have any other changes?
>
> [User]: No.

As indicated in the above example conversation between the computing entity 110 and a user, the computing entity 110 may be configured to access user-specific data, such as contact lists, calendars, residential information/data, business information/data, and/or the like. The user-specific information/data may be stored locally on the computing entity 110, or may be stored on a network connected computing entity (e.g., a mobile computing entity carried by the user, a remote database, and/or the like). As a non-limiting example, a user's contact list may be stored on a user's mobile computing entity (e.g., smartphone), and the computing entity 110 may be configured to establish a wireless communication connection (e.g., via Bluetooth, Wi-Fi, and/or the like) with the user's mobile computing entity to retrieve information/data therefrom.

In various embodiments, the computing entity 110 may comprise one or more machine learning algorithms to learn shipping tendencies of a user. For example, the computing entity 110 may be configured to monitor shipments originating from the user, and to identify patterns in the shipping tendencies of the user. As a specific, non-limiting example, the computing entity 110 may be configured to recognize that a user ships the same size shipment/item each Monday to the same destination (e.g., determined based at least in part on shipment/item information/data broadcast by the shipment/item and based on user input identifying a shipping destination for the shipment/item). Accordingly, upon recognizing the shipping pattern, the computing entity 110 may be configured to suggest a shipping destination and/or other shipping parameters common to the recognized shipping pattern.

As shown in FIG. 7, upon receipt of shipment/item information/data for the shipment, the computing entity 110 may be configured to transmit the shipment/item information/data automatically to a carrier computing entity, as indicated at Block 703. The carrier computing entity 100 may comprise an Application Program Interface (API) or other computing interface configured for receiving shipment/item information/data for proposed shipments, as provided by computing entities 110. Accordingly, the computing entity 110 may be configured to provide a shipment identifier, a ship to location, a ship from location, a service level, a pickup or drop-off request (indicating whether the user would like the shipment/item picked-up by the carrier or whether the user intends to drop-off the shipment/item at a carrier location), payment information, and/or the like.

Moreover, in certain embodiments, the computing entity 110 may be configured to transmit shipment/item information/data to the shipment/item 102 upon receipt of the shipment/item information/data. In such embodiments, the shipment/item 102 may be configured to locally store shipment/item information/data thereon, such that at least a portion of the shipment/item information/data may be broadcast or otherwise transmitted from the shipment/item 102 to one or more other computing entities 110.

Upon receipt of the shipment/item information/data, the carrier computing entity 100 may be configured to initialize a shipment record/profile within the carrier computing entity 100 for the shipment, as indicated at Block 704 of FIG. 7. Moreover, in various embodiments, the carrier computing entity 100 may be configured to modify and/or generate a delivery route and/or a delivery schedule for one or more carrier employees to include a stop to pick-up the shipment/item from the noted shipment/item location (e.g., the shipper's residence and/or a carrier location where the shipper drops off the shipment/item).

In various embodiments, the carrier computing entity 100 may be configured to transmit confirmation information/data to the computing entity 110, indicating that the carrier computing entity 100 initiated the shipment process for the shipment/item 102. The computing entity may be configured to relay the confirmation information/data to the user, for example, by providing an output (e.g., an audio output) indicating that the shipment has been initiated in the carrier's system.

Based at least in part on the generated shipment record/profile for the shipment/item, the user provides the shipment/item to the carrier (e.g., by dropping the shipment/item off at a carrier location or by handing the shipment/item off to a carrier employee during a pick-up at the user's location), as indicated at Block 705. Thereafter, the carrier transports the shipment/item through the carrier's logistics network to the shipment/item destination, in accordance with shipment/item information/data stored in the shipment/item record/profile, as indicated at Block 706.

Although discussed above as indicating that the computing entity 110 is configured to interact with a user to receive shipment/item information/data for the shipment/item, it should be understood that the computing entity 110 may be configured to interact with other computing entities, such as automated delivery mechanisms (e.g., manned or unmanned terrestrial vehicles, aerial vehicles, nautical vehicles, and/or the like) when initiating a shipment/item. For example, the computing entity 110 may be configured to receive shipment/item information/data via wireless data transmission from the autonomous vehicle, and to transmit the received shipment/item information/data to a carrier computing entity 100 as discussed herein.

2. Self-Tracking Shipment/Item

In various embodiments, a connected shipment/item 102 may be configured to self-monitor its own location based on wireless connections established with one or more computing entities 110. For example, the shipment/item 102 may be configured to automatically establish wireless connections with one or more computing entities 110 (e.g., a handheld computing entity carried by a carrier employee; a computing entity associated with a carrier location; a computing entity associated with a delivery location; and/or the like).

For example, the shipment/item 102 may be configured to broadcast shipment/item information/data to one or more computing entities 110 within a transmission range of the shipment/item 102. The computing entities 110 (e.g., a handheld computing entity carried by a carrier employee) may be configured to monitor the received broadcast shipment/item information/data, and may be configured to monitor whether the shipment/item information/data is received at the computing entity 110. When the computing entity detects the presence of the shipment/item 102, the computing entity 110 is configured to determine that the location of the computing entity 110 is the same as the location of the detected shipment/item 102. Accordingly, upon the computing entity 110 self-determining its location, the computing entity 110 may transmit information/data identifying its location to the shipment/item 102, and/or to transmit information/data identifying the location of the shipment/item 102 as being the location of the computing entity 110 to a carrier computing entity 100 to record the location of the shipment/item 102.

An operative example is described below with reference to an example shipment/item 102 being transported by a carrier from an origin to a destination. The shipment/item 102 may first be initiated at a shipper's location (e.g., via an AI computing entity 110, as discussed above). In various embodiments, the computing entity 110 utilized to initialize the shipment/item 102 may be configured to attribute its own location as the location of the shipment/item 102 while the computing entity 110 is receiving (e.g., periodically) shipment/item information/data broadcast from the shipment/item 102. Accordingly, the computing entity 110 may be configured to transmit shipment/item location information/data to the carrier computing entity 100 such that the carrier computing entity 100 may store the shipment/item location information/data in association with stored shipment/item information/data.

The shipper may then transport the shipment/item 102 to a carrier location to enter the shipment/item 102 into the carrier's logistics network. During transport, a mobile computing entity 110 associated with the shipper (e.g., the shipper's smartphone and/or the shipper's vehicle) may be configured to detect shipment/item information/data broadcast from the shipment/item 102, and may be configured to attribute the current location of the mobile computing entity 110 as the location of the shipment/item 102. Accordingly, the mobile computing entity 102 may be configured to transmit (e.g., periodically transmit) information/data identifying the current location of the mobile computing entity 110 to the carrier computing entity 100 together with information/data identifying the detected shipment/item 102, such that the carrier computing entity 100 is able to update the stored location of the shipment/item 102.

Upon arrival at the carrier location, a computing entity 110 associated with the carrier location may detect the broadcast shipment/item information/data from the shipment/item 102, and may transmit information/data to the carrier computing entity 100 identifying the current location of the computing entity at the carrier location as the current location of the shipment/item 102. Again, the carrier computing entity 100 may be configured to update the stored location of the shipment/item 102.

A carrier employee may then transport the shipment/item 102 to a sort location, and accordingly a mobile computing entity 110 associated with the carrier employee (e.g., a handheld device and/or a vehicle operated by the carrier employee) may detect the broadcast shipment/item information/data from the shipment/item, and may transmit information/data to the carrier computing entity 100 identifying the current location of the mobile computing entity at the carrier location as the current location of the shipment/item. Again, the carrier computing entity 100 may be configured to update the stored location of the shipment/item.

Once at the sort location, a computing entity 110 associated with the sort location may detect the broadcast shipment/item information/data from the shipment/item 102, and may transmit information/data to the carrier computing entity 100 identifying the current location of the computing entity 110 at the sort location as the current location of the shipment/item 102. Again, the carrier computing entity 100 may be configured to update the stored location of the shipment/item 102.

The shipment/item 102 may be loaded onto an inter-facility carrier transport vehicle, and accordingly one or more computing entities 110 associated with the transport vehicle may be configured to detect the broadcast shipment/item data, and to inform the carrier computing entity 100 of the current location of the shipment/item 102 in a manner analogous to that discussed above. Once at a second sort location, the process may again repeat to update the location of the shipment/item 102 as the second sort location.

The shipment/item 102 may then be loaded onto a final delivery vehicle for delivery to a destination location. Accordingly, one or more computing entities 110 associated with the final delivery vehicle (e.g., a vehicle operator's mobile device and/or a computing entity associated with the delivery vehicle) may detect the presence of the shipment/item 102 in light of the broadcast shipment/item data, and may transmit information/data to the carrier computing entity 100 indicative of the current location of the shipment/item 102, as identified based on the current location of the mobile computing entity 110.

Finally, upon delivery at the destination location, one or more computing entities 110 associated with the final delivery destination (e.g., a home computer, a home doorbell, a mobile device at the delivery destination, and/or the like) may be configured to detect the presence of the shipment/item 102 and may be configured to transmit information/data to the carrier computing entity 100 indicative of the current location of the shipment/item. In various embodiments, the carrier computing entity 100 may be configured to utilize the location information/data received from the destination location as an electronic signature of delivery confirmation at the intended destination. The carrier computing entity 100 may verify the location information/data received for the shipment/item 102 against the intended destination location for the shipment/item 102, and upon establishing a match, the carrier computing entity 100 may be configured to generate and store information/data in association with the shipment/item identifier information/data indicating that the shipment/item 102 is properly delivered to the destination location.

It should be understood that any of a variety of combinations of the above location determinations may be utilized while tracking the current location of a shipment/item 102. Moreover, although the above-mentioned example indicates that the shipment/item 102 may constantly and/or periodically broadcast information/data that may be detected by various computing entities 110, it should be understood that any of a variety of wireless communication methodologies may be utilized to establish a wireless connection between the shipment/item 102 and a computing entity 110. For example, the computing entity 110 may be configured to periodically transmit a wireless signal (e.g., a ping, an activation signal, and/or the like) to shipments/items 102 within a transmission range 111 of the computing entities 110. The shipments/items 102 may be configured to return the received signal together with information/data identifying the identity of the shipment/item 102. In other embodiments, the computing entities 110 may be configured to establish a wireless communication connection between the shipment/item 102 and the computing entity (e.g., via Wi-Fi, Bluetooth, BLE, NFC, and/or the like) to transmit information/data between the shipment/item 102 and the computing entity 110 and/or to establish that the shipment/item 110 is sufficiently nearby the computing entity 110 that the computing entity's location provides an accurate estimate of the current location of the shipment/item 102.

Moreover, in certain embodiments, the shipment/item 102 may utilize one or more security algorithms to ensure the shipment/item 102 remains in the possession of one or more authorized persons (e.g., a shipper, a recipient, a carrier employee, and/or the like). In various embodiments, the shipment/item 102 must be identified as being proximate at least two computing entities having known identities to verify that the shipment/item is in the possession of an authorized person. Exemplary security algorithms are discussed in co-pending U.S. patent application Ser. No. 14/942,034, filed on Nov. 16, 2015, and incorporated herein in its entirety by reference. Accordingly, a shipment/item 102 may be configured to self-determine the identity of a purported possessor of the shipment/item 102 based on signals received from two or more computing entities proximate the shipment/item 102. For example, upon delivery of the shipment/item 102 at a destination location, the shipment/item 102 may be configured to receive signals from a computing entity 110 associated with the recipient's residence (e.g., a doorbell) and a mobile computing entity 110 carried by the recipient. Upon identifying signals received from both computing entities, the shipment/item may be configured to determine that the shipment/item has been delivered to the appropriate location and to determine that the recipient is at home to receive the shipment/item. The shipment/item may be configured to transmit information/data (e.g., directly and/or through a separate computing entity acting as a relay) to the carrier computing entity 100 indicating that delivery has been successfully completed. In another example, upon determining that the shipment/item receives signals only from the computing entity 110 associated with the recipient's residence, but it does not receive signals from the recipient's mobile computing entity 110, the shipment/item 102 may be configured to determine that the recipient is unavailable to take delivery of the shipment/item 102.

3. Augmented Reality Shipment/Item Identification

As discussed herein, various augmented reality computing entities 110 may be configured to receive information/data indicative of the identity of one or more shipments/items 102, and to provide additional information/data to a user of the augmented reality computing entity 110 regarding the one or more shipments/items 102. As a part of the augmented reality functionality, the AR computing entity 110 may be configured to correlate shipment/item information/data transmitted from a shipment/item with a particular location occupied by the shipment/item 102 to present relevant information/data to a user of the AR computing entity 110. For example, as shown in the schematic illustration of FIG. 8, an AR computing entity 110 may be configured to display an image of a shipment/item 1002 together with overlaid information/data via a display. Accordingly, the AR computing entity 110 may be configured to identify visually unique aspects of shipments/items 102 that may be utilized to identify the identity of shipments/items 102, such that shipment/item information/data attributable to the identified shipments/items 102 may be visually associated with the shipment/item 102 via a display (e.g., a screen providing an image (e.g., static or moving) of the shipment/item 1002 together with overlaid information/data regarding the shipment/item; a lens providing information/data regarding the shipment/item within a user's line of sight to the shipment/item (e.g., via a wearable lens); and/or via a projector projecting information/data onto the surface of the shipment/item. With reference again to FIG. 8, the visually unique aspect may be a label secured to the shipment/item 102 that may be identified within image information/data captured by the AR computing entity 110.

Figure 9:
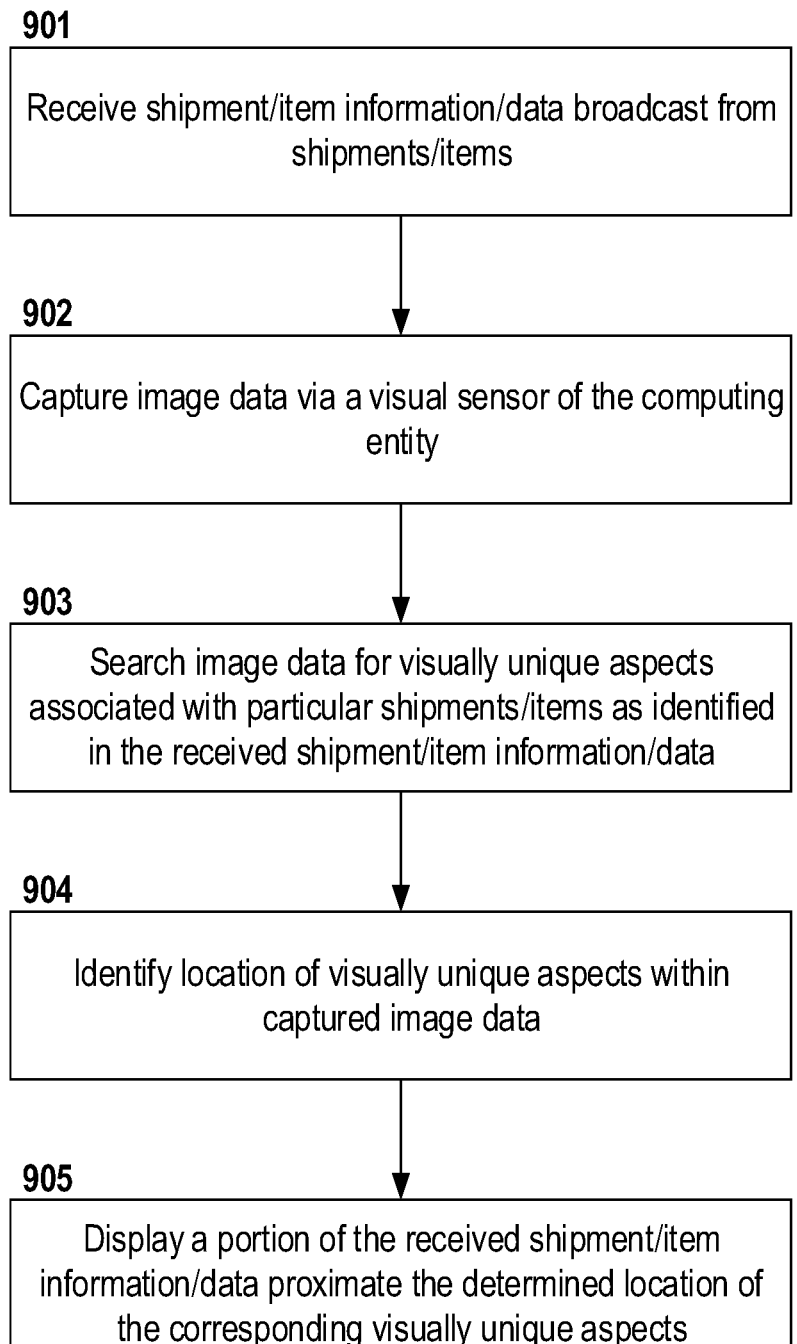
FIG. 9 is a flowchart illustrating steps for displaying shipment/item information/data via an augmented reality computing entity.

FIG. 9 is a flowchart illustrating example steps for providing shipment/item information/data via an AR computing entity 110. In operation, the AR computing entity 110 may be configured to detect shipment/item information/data broadcast from one or more shipments/items 102 (e.g., within a broadcast range of the shipments/items), as indicated at Block 901 of FIG. 9. In various embodiments, the shipment/item information/data comprises information/data identifying a visually unique aspect of the corresponding shipment/item. For example, the visually unique aspect may be identified as a symbol, a computer-readable identifier (e.g., a bar code, a QR code, a Maxicode, and/or the like), an alphanumeric symbol recognizable via OCR by the AR computing entity 110, one or more color patterns on the shipment/item 102, and/or the like.

Figure 8:
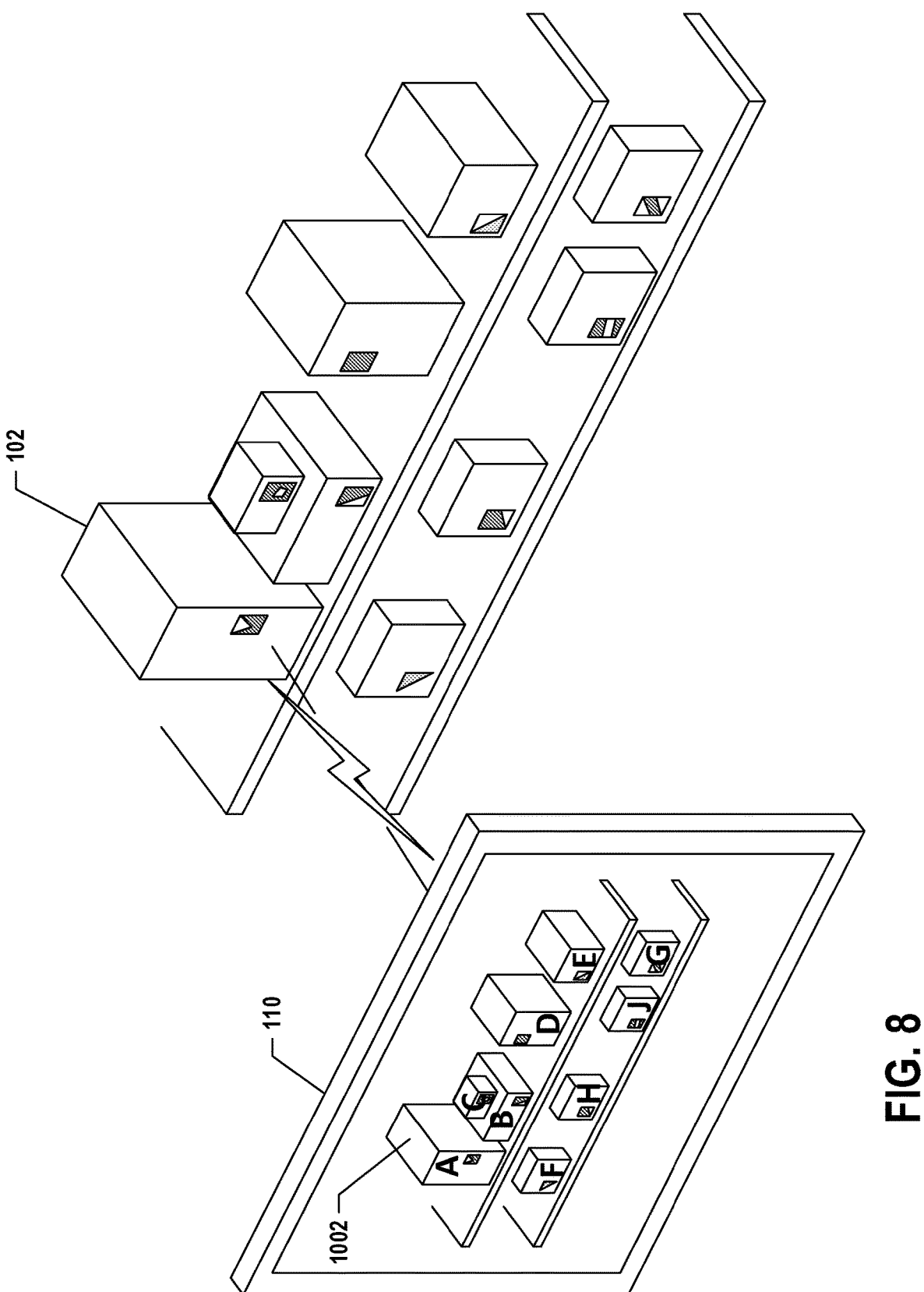
FIG. 8 is a schematic representation of an augmented reality system for providing shipment-specific information/data in accordance with certain embodiments of the present invention.

The AR computing entity 110 may be configured to capture image information/data of one or more shipments/items 102, for example, via a camera, a light scanner, and/or the like, and to search the captured image information/data for the visually unique aspects of the shipments/items 102 for which shipment/item information/data is received, as indicated at Blocks 902-903. Upon identifying the visually unique aspects of the shipments/items 102 within the image data, the AR computing entity 110 is configured to determine the location of the visually unique aspects within the captured image data, as indicated at Block 904. For example, the AR computing entity 110 may be configured to count the number of pixels between a reference location within the image information/data (e.g., an upper left corner of the captured image data) and the location of the visually unique aspect to identify the location of the visually unique aspect within the image data. Upon determining the location of the visually unique aspects within the image data, the AR computing entity 110 is configured to provide shipment-specific information/data in a location correlated to the location of the identified relevant unique identifier. For example, in embodiments in which the AR computing entity 110 is configured to display an image of the various shipments/items 1002 detected by the visual sensor, the AR computing entity 110 may be configured to generate a composite image comprising the shipment-specific information/data overlaid onto the image proximate the location of the detected unique identifier (Block 905 of FIG. 9), as shown in FIG. 8, which schematically illustrates the shipment-specific information/data as letters displayed overlaid onto the image adjacent the detected visually unique aspect. As yet another example, in embodiments in which the AR computing entity 110 comprises a transparent lens through which a user is able to review the shipments/items 102 identified by the visual sensor, the AR computing entity may be configured to generate a visual indicia of the shipment-specific information/data at a location on the lens such that the shipment-specific information/data appears overlaid onto or proximate the relevant shipment/item 102. Accordingly, the shipment-specific information/data is interposed between the user's eyes and the shipment/item 102. As yet another non-limiting example, the AR computing entity 110 may be configured to project shipment-specific information/data onto a surface of the relevant shipment/item 110, for example, via a projector. Accordingly, the AR computing entity 110 is configured to provide shipment-specific information/data 110 to a user such that a user is able to identify various attributes of shipments/items 102 based on the provided shipment-specific information/data, without requiring the user to individually request information/data regarding each specific shipment/item 102.

In various embodiments, the AR computing entity 110 may be configured to receive shipment/item information/data from a plurality of shipments/items 102 simultaneously, and to display the shipment-specific information/data regarding the plurality of shipments/items 102 simultaneously. As a specific example, the AR computing entity 110 may be configured to receive shipment/item information/data for a plurality of shipments/items 102 in a stack of shipments/items 102, and to simultaneously display the shipment-specific information/data for the plurality of shipments/items 102 in the stack (e.g., via a display, via a lens, via a projector, and/or the like).

4. Multi-Shipment/Item Shipping

As discussed herein, various shipments/items may be embodied as modular shipments/items 252 comprising a plurality of child shipments/items 253 that may be detached from the modular shipment/item 252 and sent to distinct final destination addresses. As discussed herein, each of the child shipments/items 253 may be connected shipments/items, and the child shipments/items 253 may be collectively configured to provide wireless connectivity for the modular shipment/item 253 as discussed herein.

In various embodiments, the modular shipment/item 252 may be associated with first shipment/item information/data specific to the modular shipment/item 252. The first shipment/item information/data may specify a destination location for the modular shipment/item 252 (a default destination for each of the included child shipments/items if those child shipments/items 253 are not otherwise rerouted to alternative destination locations). Because the wireless connectivity of the modular shipment/item 252 may be provided by at least one of the included child shipments/items 253, at least one of the child shipments/items 253 may store shipment/item information/data for the modular shipment/item 252 thereon. However, in certain embodiments, the child shipment/item 253 information/data may be correlated with the modular shipment/item 252 information/data (e.g., by linking the child shipment/item information/data with the modular shipment/item information/data in the carrier computing entity 100) unless and/or until the child shipment/item 253 is determined to be detached from the modular shipment/item 252. For example, upon detecting that at least two child shipments/items 253 from the modular shipment/item 252 are broadcasting shipment/item information/data, the carrier computing entity 100 (and/or another computing entity) may be configured to determine that at least one of the detected child shipment/items 253 have been detached from the modular shipment/item 252. In various embodiments, the carrier computing entity 100 may be configured to compare the relative rankings of each detected child shipment/item 253 (e.g., based at least in part on the shipment/item information/data). In certain embodiments, the highest ranking child shipment/item 253 detected to be broadcasting shipment/item information/data may be determined to be disconnected from the modular shipment/item 252 in embodiments in which the highest remaining child shipment/item 253 provides the wireless connectivity for the shipment/item. However, it should be understood that any of a variety of methodologies may be utilized to determine whether a child shipment/item 253 has been disconnected from the modular shipment/item 252.

As inferred above, each of the child shipments/items 253 may be associated with corresponding shipment/item information/data specific to the respective child shipment/item 253. The child shipment/item information/data may specify a destination for the child shipment/item 253, which may be updated if the child shipment/item 253 is redirected to an alternative destination location (e.g., a destination location different from the destination location assigned to the modular shipment/item 252).

In operation, the modular shipment/item 252 (comprising a plurality of child shipments/items 253) may be shipped from a shipper to an initial destination location. The initial destination location may be a particular carrier location, a second shipper location (e.g., a second location operated by the shipper), the original shipper location (e.g., the modular shipment/item 252 may be shipped in a round-trip through a portion of the carrier's logistics network, extending through a plurality of carrier locations before returning to the shipper, and/or the like).

Once the modular shipment/item 252 is in the carrier logistics network, the modular shipment/item 252 may be configured to self-monitor its location, as discussed herein. Moreover, once the shipment/item is introduced into the carrier's shipping network, the shipper may continue to solicit orders for items contained in one or more of the child shipments/items 253 of the modular shipment/item 252. Once an order for a child shipment/item 253 is received by the shipper and an alternative destination location is identified for at least one of the child shipments/items 253, the shipper may transmit instructions to the carrier (e.g., by transmitting instruction information/data from a shipper computing entity to the carrier computing entity 100) identifying the alternative destination location for at least one of the child shipments/items 253. The carrier computing entity 100 may then update the modular shipment/item information/data to indicate that at least one of the child shipments/items 253 are to be disconnected from the modular shipment/item 252 and redirected to the alternative destination location. In certain embodiments, the carrier computing entity 100 may identify a specific child shipment/item 253 (e.g., in embodiments in which each child shipment/item 253 contains a unique item), or the carrier computing entity 100 may simply specify that any one of the plurality of child shipments/items 253 should be disconnected and rerouted to the alternative destination location.

By updating the modular shipment/information data, the carrier computing entity 100 provides a notification to computing entities retrieving information/data about the modular shipment/item 252 that at least one of the child shipments/items 253 is to be disconnected from the modular shipment/item 252. Upon receipt of the notification to disconnect one or more of the child shipments/items 253, a carrier employee and/or an automated shipment/item handler may be configured to automatically disconnect the at least one child shipment/item 253 from the modular shipment/item 252 to initiate redirection of the child shipment/item 253.

Upon disconnecting the at least one child shipment/item 253 from the modular shipment/item 252, the wireless connectivity aspects of the child shipment/item 253 activate (if they were not already active). In the event the disconnected child shipment/item 253 had been providing wireless connectivity for the modular shipment/item 252, then another of the still-connected child shipments/items 253 activates to continue providing wireless connectivity for the modular shipment/item 252. As discussed herein, the highest ranking child shipment/item 253 that remains secured to the modular shipment/item 252 becomes active to provide wireless connectivity for the modular shipment/item 252.

The disconnected child shipment/item 253 is thereafter rerouted to the alternative destination location based on the updated shipment/item information/data. In various embodiments, a shipping label indicative of the updated shipment/item information/data may be secured relative to the child shipment/item 253.

Conclusion

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method comprising:
   broadcasting, by a computing entity, an activation signal within a communication range surrounding the computing entity;
   detecting, via a wireless communication component of the computing entity, item information data from an electronically connected item, wherein the activation signal causes the electronically connected item to transmit the item information data in response to the electronically connected item being brought within the communication range;

identifying, by the computing entity and from the item information data, a visually unique aspect of the electronically connected item;
   capturing, by the computing entity via at least one of a camera or a light scanner, image data of the electronically connected item;
   identifying, by the computing entity, a location of the visually unique aspect of the electronically connected item in the image data of the electronically connected item;
   generating, by the computing entity, second image data of item-specific information for the electronically connected item;
   generating, by the computing entity, a composite image comprising the second image data of the item-specific information overlaid onto the image data of the electronically connected item onto or proximate to the location of the visually unique aspect of the electronically connected item; and
   causing, by the computing entity, display of the composite image.

2. The method of claim 1, wherein identifying the location of the visually unique aspect of the electronically connected item in the image data of the electronically connected item involves:
   detecting a position of the visually unique aspect in the image data of the electronically connected item; and
   counting a number of pixels in the image data of the electronically connected item between a reference position in the image data of the electronically connected item and the position of the visually unique aspect.

3. The method of claim 1, wherein the visually unique aspect comprises at least one of a label, a computer-readable identifier, an alphanumeric symbol, or a color pattern.

4. The method of claim 1, wherein the item information data is transmitted from the electronically connected item via a wireless transmitter physically secured to the electronically connected item.

5. The method of claim 1, further comprising transmitting, by the computing entity, a request to a carrier computing entity to pick-up the electronically connected item at a designated location.

6. The method of claim 1, wherein the electronically connected item comprises packaging materials that comprise one or more electronic contacts and onboard computing components that, upon the packaging materials being closed and sealed, the one or more electronic contacts form a closed circuit with the onboard computing components, and the onboard computing components automatically activate to enable transmitting the item information data.

7. The method of claim 1, wherein the item-specific information comprises at least a portion of the item information data.

8. A computing entity comprising:
   a transparent lens;
   a wireless communication component;
   a non-transitory computer-readable medium storing instructions; and
   a processing device communicatively coupled to the non-transitory computer-readable medium, wherein the processing device is configured to execute the instructions and thereby perform operations comprising:
      broadcasting an activation signal within a communication range surrounding the computing entity;
      detecting, via the wireless communication component, item information data from an electronically connected item, wherein the activation signal causes the electronically connected item to transmit the item information data in response to the electronically connected item being brought within the communication range;

identifying, from the item information data, a visually unique aspect of the electronically connected item;

capturing image data of the electronically connected item;

detecting a position of the visually unique aspect in the image data of the electronically connected item;

counting a number of pixels in the image data of the electronically connected item between a reference position in the image data of the electronically connected item and the position of the visually unique aspect to identify a location of the visually unique aspect of the electronically connected item in the image data of the electronically connected item; and generating visual indicium of item-specific information for the electronically connected item on the transparent lens such that the item-specific information appears overlaid onto or proximate to the location of the visually unique aspect.

9. The computing entity of claim 8, wherein the computing entity is embodied as glasses and the item-specific information is interposed between eyes of a user who is wearing the glasses and the electronically connected item.

10. The computing entity of claim 8, wherein the visually unique aspect comprises at least one of a label, a computer-readable identifier, an alphanumeric symbol, or a color pattern.

11. The computing entity of claim 8, wherein the item information data is transmitted from the electronically connected item via a wireless transmitter physically secured to the electronically connected item.

12. The computing entity of claim 8, wherein the operations further comprise transmitting a request to a carrier computing entity to pick-up the electronically connected item at a designated location.

13. The computing entity of claim 8, wherein the electronically connected item comprises packaging materials that comprise one or more electronic contacts and onboard computing components that, upon the packaging materials being closed and sealed, the one or more electronic contacts form a closed circuit with the onboard computing components, and the onboard computing components automatically activate to enable transmitting the item information data.

14. A computing entity comprising:

a projector;

a wireless communication component;

a non-transitory computer-readable medium storing instructions; and a processing device communicatively coupled to the non-transitory computer-readable medium, wherein the processing device is configured to execute the instructions and thereby perform operations comprising:

broadcasting an activation signal within a communication range surrounding the computing entity;

detecting, via the wireless communication component, item information data from an electronically connected item, wherein the activation signal causes the electronically connected item to transmit the item information data in response to the electronically connected item being brought within the communication range;

identifying, from the item information data, a visually unique aspect of the electrically connected item;

capturing image data of the electronically connected electronically connected item;

detecting a position of the visually unique aspect in the image data of the electronically connected item;

counting a number of pixels in the image data of the electronically connected item between a reference position in the image data of the electronically connected item and the position of the visually unique aspect to identify a location of the visually unique aspect of the electronically connected item in the image data of the electronically connected item; and projecting, via the projector, visual indicium of item-specific information for the electronically connected item onto a surface of the electronically connected item at or approximate to the location of the visually unique aspect.

15. The computing entity of claim 14, wherein the visually unique aspect comprises at least one of a label, a computer-readable identifier, an alphanumeric symbol, or a color pattern.

16. The computing entity of claim 14, wherein the item information data is transmitted from the electronically connected item via a wireless transmitter physically secured to the electronically connected item.

17. The computing entity of claim 14, wherein the operations further comprise transmitting a request to a carrier computing entity to pick-up the electronically connected item at a designated location.

18. The computing entity of claim 14, wherein the electronically connected item comprises packaging materials that comprise one or more electronic contacts and onboard computing components that, upon the packaging materials being closed and sealed, the one or more electronic contacts form a closed circuit with the onboard computing components, and the onboard computing components automatically activate to enable transmitting the item information data.

* * * * *